US012508751B2

(12) United States Patent
Bauman et al.

(10) Patent No.: US 12,508,751 B2
(45) Date of Patent: Dec. 30, 2025

(54) INSULATION COMPACTION DEVICE AND METHOD FOR FORMING AN INSULATED STRUCTURE FOR AN APPLIANCE

(71) Applicant: WHIRLPOOL CORPORATION, Benton Harbor, MI (US)

(72) Inventors: Gregory E. Bauman, Stevensville, MI (US); Lynne F. Hunter, Dorr, MI (US); Ryan D. Kannegieter, Grand Rapids, MI (US); Sai B. Krishna, Pune (IN); Subrata Shannigrahi, St. Joseph, MI (US); Aaron M. Stewart, Niles, MI (US); Eric J. Dherde, St. Joseph, MI (US); Lorraine J. Westlake, Eau Claire, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 912 days.

(21) Appl. No.: 17/521,084

(22) Filed: Nov. 8, 2021

(65) Prior Publication Data

US 2022/0055262 A1 Feb. 24, 2022

Related U.S. Application Data

(63) Continuation-in-part of application No. 14/961,956, filed on Dec. 8, 2015, now abandoned.

(51) Int. Cl.
*B29C 43/58* (2006.01)
*B29C 43/00* (2006.01)
(Continued)

(52) U.S. Cl.
CPC ............ *B29C 43/58* (2013.01); *B29C 43/003* (2013.01); *B29C 43/183* (2013.01); *B29C 43/32* (2013.01);
(Continued)

(58) Field of Classification Search
CPC ......... B29C 43/58; B29C 43/18; B29C 43/00; B29C 43/183; B29C 43/003; B29C 43/006; F25D 23/02; F25D 2201/122; B28B 3/06
See application file for complete search history.

(56) References Cited

U.S. PATENT DOCUMENTS 948,541 A 2/1910 Coleman
1,275,511 A 8/1918 Welch
(Continued)

FOREIGN PATENT DOCUMENTS

CA 626838 A 5/1961
CA 1320631 7/1993
(Continued)

OTHER PUBLICATIONS

CN204076872 English translation prepared Mar. 14, 2025 (Year: 2025).*

(Continued)

*Primary Examiner* — Alison L Hindenlang
*Assistant Examiner* — Shibin Liang
(74) *Attorney, Agent, or Firm* — Price Heneveld LLP

(57) ABSTRACT

An insulation compaction device includes an insulating structure of an appliance and has an insulating media disposed within an insulating cavity. An operable piston selectively engages the insulating structure and operates to define a selected cavity volume of the insulating cavity and a selected insulation density of the insulating media. A valve is attached to the insulating structure and in a passive state releases gas from the insulating cavity to the exterior during operation of the operable piston. Selective operation of a pump mechanism places the valve in an active state to extract gas from the insulating cavity and define a cavity pressure of the insulating cavity that is less than an equalized
(Continued)

10 42 62 20 236 270 234 216 390 230 60 90 312 214 342 384 262 250 284 290 282 12 pressure. The operable piston and the pump mechanism are at least one of sequentially and simultaneously operable to define a selected piston chamber environment defined by the selected cavity volume and the cavity pressure.

20 Claims, 25 Drawing Sheets

(51) Int. Cl.
*B29C 43/18* (2006.01)
*B29C 43/32* (2006.01)
*B29C 44/18* (2006.01)
*B29L 31/00* (2006.01)
*F25D 23/02* (2006.01)

(52) U.S. Cl.
CPC ...... *B29C 44/18* (2013.01); *B29C 2043/3205* (2013.01); *B29C 2043/5808* (2013.01); *B29K 2995/0063* (2013.01); *B29L 2031/7622* (2013.01); *F25D 23/02* (2013.01); *F25D 2201/122* (2013.01); *F25D 2201/124* (2013.01); *F25D 2201/14* (2013.01)

(56) References Cited

U.S. PATENT DOCUMENTS 1,849,369 A 3/1932 Frost
1,921,576 A 8/1933 Muffly
2,108,212 A 2/1938 Schellens
2,128,336 A 8/1938 Torstensson
2,164,143 A 6/1939 Munters
2,191,659 A 2/1940 Hintze
2,318,744 A 5/1943 Brown
2,356,827 A 8/1944 Coss et al.
2,432,042 A 12/1947 Richard
2,439,602 A 4/1948 Heritage
2,439,603 A 4/1948 Heritage
2,451,884 A 10/1948 Stelzer
2,538,780 A 1/1951 Hazard
2,559,356 A 7/1951 Hedges
2,729,863 A 1/1956 Kurtz
2,768,046 A 10/1956 Evans
2,817,123 A 12/1957 Jacobs
2,942,438 A 6/1960 Schmeling
2,985,075 A 5/1961 Knutsson-Hall
3,086,830 A 4/1963 Malia
3,125,388 A 3/1964 Constantini et al.
3,137,900 A 6/1964 Carbary
3,218,111 A 11/1965 Steiner
3,258,883 A 7/1966 Campanaro et al.
3,290,893 A 12/1966 Haldopoulos
3,338,451 A 8/1967 Kesling
3,353,301 A 11/1967 Heilweil et al.
3,353,321 A 11/1967 Heilweil et al.
3,358,059 A 12/1967 Snyder
3,379,481 A 4/1968 Fisher
3,408,316 A 10/1968 Mueller et al.
3,471,416 A 10/1969 Fijal
3,597,850 A 8/1971 Jenkins
3,607,169 A 9/1971 Coxe
3,632,012 A 1/1972 Kitson
3,633,783 A * 1/1972 Aue .................... F25D 23/085 220/592.06
3,634,971 A 1/1972 Kesling
3,635,536 A 1/1972 Lackey et al.
3,670,521 A 6/1972 Dodge, III et al.
3,688,384 A 9/1972 Mizushima et al.
3,769,770 A 11/1973 Deschamps et al.
3,862,880 A 1/1975 Feldman
3,868,829 A 3/1975 Mann et al.
3,875,683 A 4/1975 Waters
3,910,658 A 10/1975 Lindenschmidt
3,933,398 A 1/1976 Haag
3,935,787 A 2/1976 Fisher
4,005,919 A 2/1977 Hoge et al.
4,006,947 A 2/1977 Haag et al.
4,043,624 A 8/1977 Lindenschmidt
4,050,145 A 9/1977 Benford
4,067,628 A 1/1978 Sherburn
4,170,391 A 10/1979 Bottger
4,242,241 A 12/1980 Rosen et al.
4,260,876 A 4/1981 Hochheiser
4,303,730 A 12/1981 Torobin
4,303,732 A 12/1981 Torobin
4,325,734 A 4/1982 Burrage et al.
4,330,310 A 5/1982 Tate, Jr. et al.
4,332,429 A 6/1982 Frick et al.
4,396,362 A 8/1983 Thompson et al.
4,417,382 A 11/1983 Schilf
4,492,368 A 1/1985 DeLeeuw et al.
4,529,368 A 7/1985 Makansi
4,548,196 A 10/1985 Torobin
4,583,796 A 4/1986 Nakajima et al.
4,660,271 A 4/1987 Lenhardt
4,671,909 A 6/1987 Torobin
4,671,985 A 6/1987 Rodrigues et al.
4,681,788 A 7/1987 Barito et al.
4,745,015 A 5/1988 Cheng et al.
4,777,154 A 10/1988 Torobin
4,781,968 A 11/1988 Kellerman
4,790,901 A * 12/1988 Kettelhoit .............. B30B 15/34 219/466.1
4,805,293 A 2/1989 Buchser
4,865,875 A 9/1989 Kellerman
4,870,735 A 10/1989 Jahr et al.
4,914,341 A 4/1990 Weaver et al.
4,917,841 A 4/1990 Jenkins
5,007,226 A 4/1991 Nelson
5,018,328 A 5/1991 Cur et al.
5,033,636 A 7/1991 Jenkins
5,066,437 A 11/1991 Barito et al.
5,082,335 A 1/1992 Cur et al.
5,084,320 A 1/1992 Barito et al.
5,094,899 A 3/1992 Rusek, Jr.
5,118,174 A 6/1992 Benford et al.
5,121,593 A 6/1992 Forslund
5,157,893 A 10/1992 Benson et al.
5,168,674 A 12/1992 Molthen
5,171,346 A 12/1992 Hallett
5,175,975 A 1/1993 Benson et al.
5,212,143 A 5/1993 Torobin
5,221,136 A 6/1993 Hauck et al.
5,227,245 A 7/1993 Brands et al.
5,231,811 A 8/1993 Andrepont et al.
5,248,196 A 9/1993 Lynn et al.
5,251,455 A 10/1993 Cur et al.
5,252,408 A 10/1993 Bridges et al.
5,263,773 A 11/1993 Gable et al.
5,273,801 A 12/1993 Barry et al.
5,318,108 A 6/1994 Benson et al.
5,340,208 A 8/1994 Hauck et al.
5,353,868 A 10/1994 Abbott
5,359,795 A 11/1994 Mawby et al.
5,375,428 A 12/1994 LeClear et al.
5,397,759 A 3/1995 Torobin
5,418,055 A 5/1995 Chen et al.
5,433,056 A 7/1995 Benson et al.
5,477,676 A 12/1995 Benson et al.
5,500,287 A 3/1996 Henderson
5,500,305 A * 3/1996 Bridges .................. E04B 1/803 29/DIG. 44
5,505,810 A 4/1996 Kirby et al.
5,507,999 A 4/1996 Copsey et al.
5,509,248 A * 4/1996 Dellby ................. F25D 23/062 220/592.27
5,512,345 A 4/1996 Tsutsumi et al.
5,532,034 A 7/1996 Kirby et al.
5,533,311 A 7/1996 Tirrell et al.
5,562,154 A 10/1996 Benson et al.
5,586,680 A 12/1996 Dellby et al.
5,599,081 A 2/1997 Revlett et al.
5,600,966 A 2/1997 Valence et al.

(56) References Cited

U.S. PATENT DOCUMENTS 5,632,543 A 5/1997 McGrath et al.
5,640,828 A 6/1997 Reeves et al.
5,643,485 A 7/1997 Potter et al.
5,652,039 A 7/1997 Tremain et al.
5,716,581 A 2/1998 Tirrell et al.
5,768,837 A 6/1998 Sjoholm
5,792,801 A 8/1998 Tsuda et al.
5,813,454 A 9/1998 Potter
5,826,780 A 10/1998 Nesser et al.
5,827,385 A 10/1998 Meyer et al.
5,834,126 A 11/1998 Sheu
5,843,353 A 12/1998 De Vos et al.
5,866,228 A 2/1999 Awata
5,866,247 A * 2/1999 Klatt et al. .............. F16L 59/04 428/317.1
5,868,890 A 2/1999 Fredrick
5,900,299 A 5/1999 Wynne
5,918,478 A 7/1999 Bostic et al.
5,924,295 A 7/1999 Park
5,950,395 A 9/1999 Takemasa et al.
5,952,404 A 9/1999 Simpson et al.
5,966,963 A 10/1999 Kovalaske
5,985,189 A 11/1999 Lynn et al.
6,013,700 A 1/2000 Asano et al.
6,063,471 A 5/2000 Dietrich et al.
6,094,922 A 8/2000 Ziegler
6,109,712 A 8/2000 Haworth et al.
6,128,914 A 10/2000 Tamaoki et al.
6,132,837 A 10/2000 Boes et al.
6,158,233 A 12/2000 Cohen et al.
6,163,976 A 12/2000 Tada et al.
6,164,030 A 12/2000 Dietrich
6,164,739 A 12/2000 Schulz et al.
6,187,256 B1 2/2001 Aslan et al.
6,209,342 B1 4/2001 Banicevic et al.
6,210,625 B1 4/2001 Matsushita et al.
6,220,473 B1 4/2001 Lehman et al.
6,221,456 B1 4/2001 Pogorski et al.
6,224,179 B1 5/2001 Wenning et al.
6,244,458 B1 6/2001 Frysinger et al.
6,260,377 B1 7/2001 Tamaoki et al.
6,266,970 B1 7/2001 Nam et al.
6,294,595 B1 9/2001 Tyagi et al.
6,305,768 B1 10/2001 Nishimoto
6,390,378 B1 5/2002 Briscoe, Jr. et al.
6,406,449 B1 6/2002 Moore et al.
6,408,841 B1 6/2002 Hirath et al.
6,415,623 B1 7/2002 Jennings et al.
6,428,130 B1 8/2002 Banicevic et al.
6,430,780 B1 8/2002 Kim et al.
6,460,955 B1 10/2002 Vaughan et al.
6,485,122 B2 11/2002 Wolf et al.
6,519,919 B1 2/2003 Takenouchi et al.
6,623,413 B1 9/2003 Wynne
6,629,429 B1 10/2003 Kawamura et al.
6,651,444 B2 11/2003 Morimoto et al.
6,655,766 B2 12/2003 Hodges
6,689,840 B1 2/2004 Eustace et al.
6,716,501 B2 4/2004 Kovalchuk et al.
6,736,472 B2 5/2004 Banicevic
6,749,780 B2 6/2004 Tobias
6,773,082 B2 8/2004 Lee
6,858,280 B2 2/2005 Allen et al.
6,860,082 B1 3/2005 Yamamoto et al.
6,938,968 B2 9/2005 Tanimoto et al.
6,997,530 B2 2/2006 Avendano et al.
7,008,032 B2 3/2006 Chekal et al.
7,026,054 B2 4/2006 Ikegawa et al.
7,197,792 B2 4/2007 Moon
7,197,888 B2 4/2007 LeClear et al.
7,207,181 B2 4/2007 Murray et al.
7,210,308 B2 5/2007 Tanimoto et al.
7,234,247 B2 6/2007 Maguire
7,263,744 B2 9/2007 Kim et al.
7,278,279 B2 10/2007 Hirai et al.
7,284,390 B2 10/2007 Van Meter et al.
7,296,432 B2 11/2007 Muller et al.
7,316,125 B2 1/2008 Jekado et al.
7,343,757 B2 3/2008 Egan et al.
7,360,371 B2 4/2008 Feinauer et al.
7,386,992 B2 6/2008 Adamski et al.
7,449,227 B2 11/2008 Echigoya et al.
7,475,562 B2 1/2009 Jackovin
7,517,031 B2 4/2009 Laible
7,517,576 B2 4/2009 Echigoya et al.
7,537,817 B2 5/2009 Tsunetsugu et al.
7,614,244 B2 11/2009 Venkatakrishnan et al.
7,625,622 B2 12/2009 Teckoe et al.
7,641,298 B2 1/2010 Hirath et al.
7,665,326 B2 2/2010 LeClear et al.
7,703,217 B2 4/2010 Tada et al.
7,703,824 B2 4/2010 Kittelson et al.
7,757,511 B2 7/2010 LeClear et al.
7,762,634 B2 7/2010 Tenra et al.
7,794,805 B2 9/2010 Aumaugher et al.
7,815,269 B2 10/2010 Wenning et al.
7,842,269 B2 11/2010 Schachtely et al.
7,845,745 B2 12/2010 Gorz et al.
7,861,538 B2 1/2011 Welle et al.
7,886,559 B2 2/2011 Hell et al.
7,893,123 B2 2/2011 Luisi
7,905,614 B2 3/2011 Aoki
7,908,873 B1 3/2011 Cur et al.
7,930,892 B1 4/2011 Vonderhaar
7,938,148 B2 5/2011 Carlier et al.
7,992,257 B2 8/2011 Kim
8,049,518 B2 11/2011 Wern et al.
8,074,469 B2 12/2011 Hamel et al.
8,079,652 B2 12/2011 Laible et al.
8,083,985 B2 12/2011 Luisi et al.
8,108,972 B2 2/2012 Bae et al.
8,113,604 B2 2/2012 Olson et al.
8,117,865 B2 2/2012 Allard et al.
8,157,338 B2 4/2012 Seo et al.
8,162,415 B2 4/2012 Hagele et al.
8,163,080 B2 4/2012 Meyer et al.
8,176,746 B2 5/2012 Allard et al.
8,182,051 B2 5/2012 Laible et al.
8,197,019 B2 6/2012 Kim
8,202,599 B2 6/2012 Henn
8,211,523 B2 7/2012 Fujimori et al.
8,266,923 B2 9/2012 Bauer et al.
8,281,558 B2 10/2012 Hiemeyer et al.
8,299,545 B2 10/2012 Chen et al.
8,299,656 B2 10/2012 Allard et al.
8,343,395 B2 1/2013 Hu et al.
8,353,177 B2 1/2013 Adamski et al.
8,382,219 B2 2/2013 Hottmann et al.
8,434,317 B2 5/2013 Besore
8,439,460 B2 5/2013 Laible et al.
8,453,476 B2 6/2013 Kendall et al.
8,456,040 B2 6/2013 Allard et al.
8,491,070 B2 7/2013 Davis et al.
8,516,845 B2 8/2013 Wuesthoff et al.
8,522,563 B2 9/2013 Allard et al.
8,528,284 B2 9/2013 Aspenson et al.
8,590,992 B2 11/2013 Lim et al.
8,717,029 B2 5/2014 Chae et al.
8,726,690 B2 5/2014 Cur et al.
8,733,123 B2 5/2014 Adamski et al.
8,739,567 B2 6/2014 Junge
8,739,568 B2 6/2014 Allard et al.
8,752,918 B2 6/2014 Kang
8,752,921 B2 6/2014 Gorz et al.
8,756,952 B2 6/2014 Adamski et al.
8,763,847 B2 7/2014 Mortarotti
8,764,133 B2 7/2014 Park et al.
8,770,682 B2 7/2014 Lee et al.
8,776,390 B2 7/2014 Hanaoka et al.
8,790,477 B2 7/2014 Tenra et al.
8,840,204 B2 9/2014 Bauer et al.
8,852,708 B2 10/2014 Kim et al.
8,871,323 B2 10/2014 Kim et al.
8,881,398 B2 11/2014 Hanley et al.

(56) References Cited

U.S. PATENT DOCUMENTS 8,899,068 B2 12/2014 Jung et al.
8,905,503 B2 12/2014 Sahasrabudhe et al.
8,927,084 B2 1/2015 Jeon et al.
8,943,770 B2 2/2015 Sanders et al.
8,944,541 B2 2/2015 Allard et al.
8,955,352 B2 2/2015 Lee et al.
8,986,483 B2 3/2015 Cur et al.
9,009,969 B2 4/2015 Choi et al.
RE45,501 E 5/2015 Maguire
9,038,403 B2 5/2015 Cur et al.
9,056,952 B2 6/2015 Eilbracht et al.
9,071,907 B2 6/2015 Kuehl et al.
9,074,811 B2 7/2015 Korkmaz
9,080,808 B2 7/2015 Choi et al.
9,102,076 B2 8/2015 Doshi et al.
9,103,482 B2 8/2015 Fujimori et al.
9,125,546 B2 9/2015 Kleemann et al.
9,140,480 B2 9/2015 Kuehl et al.
9,140,481 B2 9/2015 Cur et al.
9,170,045 B2 10/2015 Oh et al.
9,170,046 B2 10/2015 Jung et al.
9,182,158 B2 11/2015 Wu
9,188,382 B2 11/2015 Kim et al.
9,221,210 B2 12/2015 Wu et al.
9,228,386 B2 1/2016 Thielmann et al.
9,252,570 B2 2/2016 Allard et al.
9,267,727 B2 2/2016 Lim et al.
9,303,915 B2 4/2016 Kim et al.
9,328,951 B2 5/2016 Shin et al.
9,353,984 B2 5/2016 Kim et al.
9,410,732 B2 8/2016 Choi et al.
9,423,171 B2 8/2016 Betto et al.
9,429,356 B2 8/2016 Kim et al.
9,448,004 B2 9/2016 Kim et al.
9,463,917 B2 10/2016 Wu et al.
9,482,463 B2 11/2016 Choi et al.
9,506,689 B2 11/2016 Carbajal et al.
9,518,777 B2 12/2016 Lee et al.
9,568,238 B2 2/2017 Kim et al.
D781,641 S 3/2017 Incukur
D781,642 S 3/2017 Incukur
9,605,891 B2 3/2017 Lee et al.
9,696,085 B2 7/2017 Seo et al.
9,702,621 B2 7/2017 Cho et al.
9,759,479 B2 9/2017 Ramm et al.
9,777,958 B2 10/2017 Choi et al.
9,791,204 B2 10/2017 Kim et al.
9,833,942 B2 12/2017 Wu et al.
10,041,724 B2 8/2018 Allo et al.
10,222,116 B2 3/2019 Allo et al.
10,605,519 B2 3/2020 Allo et al.
10,907,886 B2 2/2021 Allo et al.
2002/0004111 A1 1/2002 Matsubara et al.
2002/0114937 A1 8/2002 Albert et al.
2002/0144482 A1 10/2002 Henson et al.
2002/0168496 A1 11/2002 Morimoto et al.
2003/0008100 A1 1/2003 Horn
2003/0041612 A1 3/2003 Piloni et al.
2003/0056334 A1 3/2003 Finkelstein
2003/0157284 A1 8/2003 Tanimoto et al.
2003/0167789 A1 9/2003 Tanimoto et al.
2003/0173883 A1 9/2003 Koons
2004/0144130 A1 7/2004 Jung
2004/0178707 A1 9/2004 Avendano
2004/0180176 A1 9/2004 Rusek
2004/0226141 A1 11/2004 Yates et al.
2004/0253406 A1 12/2004 Hayashi et al.
2005/0042247 A1 2/2005 Gomoll et al.
2005/0229614 A1 10/2005 Ansted
2005/0235682 A1 10/2005 Hirai et al.
2006/0064846 A1 3/2006 Espindola et al.
2006/0076863 A1 4/2006 Echigoya et al.
2006/0201189 A1 9/2006 Adamski et al.
2006/0261718 A1 11/2006 Miseki et al.
2006/0263571 A1 11/2006 Tsunetsugu et al.
2006/0266075 A1 11/2006 Itsuki et al.
2007/0001563 A1 1/2007 Park et al.
2007/0099502 A1 5/2007 Ferinauer
2007/0176526 A1 8/2007 Gomoll et al.
2007/0266654 A1 11/2007 Noale
2008/0044488 A1 2/2008 Zimmer et al.
2008/0048540 A1 2/2008 Kim
2008/0138458 A1 6/2008 Ozasa et al.
2008/0196441 A1 8/2008 Ferreira
2008/0300356 A1 12/2008 Meyer et al.
2008/0309210 A1 12/2008 Luisi et al.
2009/0032541 A1 2/2009 Rogala et al.
2009/0056367 A1 3/2009 Neumann
2009/0058244 A1 3/2009 Cho et al.
2009/0113925 A1 5/2009 Korkmaz
2009/0131571 A1 5/2009 Fraser et al.
2009/0179541 A1 7/2009 Smith et al.
2009/0205357 A1 8/2009 Lim et al.
2009/0302728 A1 12/2009 Rotter et al.
2009/0322470 A1 12/2009 Yoo et al.
2009/0324871 A1 12/2009 Henn
2010/0206464 A1 8/2010 Heo et al.
2010/0218543 A1 9/2010 Duchame
2010/0231109 A1 9/2010 Matzke et al.
2010/0287843 A1 11/2010 Oh
2010/0287974 A1 11/2010 Cur et al.
2010/0293984 A1 11/2010 Adamski et al.
2010/0295435 A1 11/2010 Kendall et al.
2011/0011119 A1 1/2011 Kuehl et al.
2011/0023527 A1 2/2011 Kwon et al.
2011/0030894 A1 2/2011 Tenra et al.
2011/0095669 A1 4/2011 Moon et al.
2011/0146325 A1 6/2011 Lee
2011/0146335 A1 6/2011 Jung et al.
2011/0165367 A1 7/2011 Kojima et al.
2011/0215694 A1 9/2011 Fink et al.
2011/0220662 A1 9/2011 Kim et al.
2011/0241513 A1 10/2011 Nomura et al.
2011/0241514 A1 10/2011 Nomura et al.
2011/0260351 A1 10/2011 Corradi et al.
2011/0290808 A1 12/2011 Bai et al.
2011/0309732 A1 12/2011 Horil et al.
2011/0315693 A1 12/2011 Cur et al.
2012/0000234 A1 1/2012 Adamski et al.
2012/0011879 A1 1/2012 Gu
2012/0060544 A1 3/2012 Lee et al.
2012/0099255 A1 4/2012 Lee et al.
2012/0103006 A1 5/2012 Jung et al.
2012/0104923 A1 5/2012 Jung et al.
2012/0118002 A1 5/2012 Kim et al.
2012/0137501 A1 6/2012 Allard et al.
2012/0152151 A1 6/2012 Meyer et al.
2012/0196059 A1 8/2012 Fujimori et al.
2012/0231204 A1 9/2012 Jeon et al.
2012/0237715 A1 9/2012 McCracken
2012/0240612 A1 9/2012 Wusthoff et al.
2012/0273111 A1 11/2012 Nomura et al.
2012/0279247 A1 11/2012 Katu et al.
2012/0280608 A1 11/2012 Park et al.
2012/0285971 A1 11/2012 Junge et al.
2012/0297813 A1 11/2012 Hanley et al.
2012/0324937 A1 12/2012 Adamski et al.
2013/0026900 A1 1/2013 Oh et al.
2013/0033163 A1 2/2013 Kang
2013/0043780 A1 2/2013 Ootsuka et al.
2013/0068990 A1 3/2013 Eilbracht et al.
2013/0111941 A1 5/2013 Yu et al.
2013/0221819 A1 8/2013 Wing
2013/0255304 A1 10/2013 Cur et al.
2013/0256318 A1 10/2013 Kuehl et al.
2013/0256319 A1 10/2013 Kuehl et al.
2013/0257256 A1 10/2013 Allard et al.
2013/0257257 A1 10/2013 Cur et al.
2013/0264439 A1 10/2013 Allard et al.
2013/0270732 A1 10/2013 Wu et al.
2013/0285527 A1 10/2013 Choi et al.
2013/0293080 A1 11/2013 Kim et al.
2013/0305535 A1 11/2013 Cur et al.
2013/0328472 A1 12/2013 Shim et al.

(56) References Cited

U.S. PATENT DOCUMENTS

2014/0009055 A1 1/2014 Cho et al.
2014/0097733 A1 4/2014 Seo et al.
2014/0132144 A1 5/2014 Kim et al.
2014/0166926 A1 6/2014 Lee et al.
2014/0171578 A1 6/2014 Meyer et al.
2014/0190978 A1 7/2014 Bowman et al.
2014/0196305 A1 7/2014 Smith
2014/0216706 A1 8/2014 Melton et al.
2014/0232250 A1 8/2014 Kim et al.
2014/0260332 A1 9/2014 Wu
2014/0346942 A1 11/2014 Kim et al.
2014/0364527 A1 12/2014 Matthias et al.
2015/0011668 A1 1/2015 Kolb et al.
2015/0015133 A1 1/2015 Carbajal et al.
2015/0017386 A1 1/2015 Kolb et al.
2015/0027628 A1 1/2015 Cravens et al.
2015/0059399 A1 3/2015 Hwang et al.
2015/0115790 A1 4/2015 Ogg
2015/0147514 A1 5/2015 Shinohara et al.
2015/0159936 A1 6/2015 Oh et al.
2015/0168050 A1 6/2015 Cur et al.
2015/0176888 A1 6/2015 Cur et al.
2015/0184923 A1 7/2015 Jeon
2015/0190840 A1 7/2015 Muto et al.
2015/0224685 A1 8/2015 Amstutz
2015/0241115 A1 8/2015 Strauss et al.
2015/0241118 A1 8/2015 Wu
2015/0285551 A1 10/2015 Aiken et al.
2016/0084567 A1 3/2016 Fernandez et al.
2016/0116100 A1 4/2016 Thiery et al.
2016/0123055 A1 5/2016 Ueyama
2016/0161175 A1 6/2016 Benold et al.
2016/0178267 A1 6/2016 Hao et al.
2016/0178269 A1 6/2016 Hiemeyer et al.
2016/0235201 A1 8/2016 Soot
2016/0240839 A1 8/2016 Umeyama et al.
2016/0258671 A1 9/2016 Allard et al.
2016/0290702 A1 10/2016 Sexton et al.
2016/0348957 A1 12/2016 Hitzelberger et al.
2017/0038126 A1 2/2017 Lee et al.
2017/0157809 A1 6/2017 Deka et al.
2017/0159998 A1 6/2017 Dherde et al.
2017/0176086 A1 6/2017 Kang
2017/0184339 A1 6/2017 Liu et al.
2017/0191746 A1 7/2017 Seo
2020/0130294 A1* 4/2020 Halbritter ............... B29C 70/44

FOREIGN PATENT DOCUMENTS

CA 2259665 1/1998
CA 2640006 8/2007
CN 1158509 7/2004
CN 1970185 5/2007
CN 100359272 1/2008
CN 101437756 5/2009
CN 201680116 12/2010
CN 201748744 U 2/2011
CN 102296714 5/2012
CN 102452522 5/2012
CN 102717578 A 10/2012
CN 102720277 10/2012
CN 103072321 5/2013
CN 202973713 U 6/2013
CN 203331442 12/2013
CN 204076872 * 1/2015 ............... B30B 1/32
CN 104816478 A 8/2015
CN 105115221 12/2015
CN 2014963379 U 1/2016
DE 1150190 6/1963
DE 4110292 A1 10/1992
DE 4409091 9/1995
DE 19818890 11/1999
DE 19914105 9/2000
DE 19915311 10/2000
DE 102008026528 12/2009
DE 102009046810 5/2011
DE 102010024951 12/2011
DE 102010040346 3/2012
DE 102011051178 A1 12/2012
DE 102012223536 6/2014
DE 102012223541 6/2014
EP 0260699 3/1988
EP 0480451 4/1992
EP 0645576 A1 3/1995
EP 0691518 1/1996
EP 0860669 8/1998
EP 1087186 3/2001
EP 1200785 5/2002
EP 1243880 9/2002
EP 1496322 1/2005
EP 1505359 2/2005
EP 1602425 A1 12/2005
EP 1624263 A2 8/2006
EP 1484563 10/2008
EP 2342511 8/2012
EP 2543942 A2 1/2013
EP 2607073 6/2013
EP 2789951 10/2014
EP 2878427 A1 6/2015
FR 2980963 4/2013
FR 2991698 A1 12/2013
GB 837929 6/1960
GB 1214548 6/1960
JP 4828353 8/1973
JP 51057777 5/1976
JP 59191588 12/1984
JP 03013779 1/1991
JP 404165197 6/1992
JP 04165197 10/1992
JP 04309778 A 11/1992
JP 06159922 6/1994
JP 7001479 1/1995
JP 107167377 7/1995
JP 08300052 11/1996
JP H08303686 11/1996
JP H09166271 6/1997
JP 10113983 5/1998
JP 11159693 A 6/1999
JP 11311395 11/1999
JP 11336990 12/1999
JP 2000097390 4/2000
JP 2000117334 4/2000
JP 2000320958 A 11/2000
JP 2001038188 2/2001
JP 2001116437 4/2001
JP 2001336691 12/2001
JP 2001343176 12/2001
JP 2002068853 3/2002
JP 3438948 8/2003
JP 03478771 12/2003
JP 2004303695 10/2004
JP 2005069596 A 3/2005
JP 2005098637 A 4/2005
JP 2005114015 4/2005
JP 2005164193 6/2005
JP 2005256849 9/2005
JP 2006077792 3/2006
JP 2006161834 A 6/2006
JP 2006161945 6/2006
JP 03792801 7/2006
JP 2006200685 A 8/2006
JP 2007263186 10/2007
JP 4111096 7/2008
JP 2008157431 7/2008
JP 2008190815 8/2008
JP 2009063064 3/2009
JP 2009162402 7/2009
JP 2009524570 7/2009
JP 2010017437 1/2010
JP 2010071565 4/2010
JP 2010108199 5/2010
JP 2010145002 7/2010
JP 04545126 B2 9/2010
JP 2010236770 10/2010

(56) References Cited

FOREIGN PATENT DOCUMENTS

JP 2010276309 12/2010
JP 2011002033 1/2011
JP 2011069612 4/2011
JP 04779684 9/2011
JP 2011196644 10/2011
JP 2012026493 2/2012
JP 04897473 3/2012
JP 2012063029 3/2012
JP 2012087993 5/2012
JP 2012163258 8/2012
JP 2012189114 10/2012
JP 2012242075 12/2012
JP 2013002484 1/2013
JP 2013050242 3/2013
JP 2013050267 A 3/2013
JP 2013076471 A 4/2013
JP 2013088036 5/2013
JP 2013195009 9/2013
JP 2014201873 A * 10/2014 .............. E02B 7/00
KR 20020057547 7/2002
KR 20020080938 10/2002
KR 20030083812 11/2003
KR 20040000126 1/2004
KR 20050095357 A 9/2005
KR 100620025 B1 9/2006
KR 20070044024 4/2007
KR 1020050126499 A 6/2007
KR 1020080103845 11/2008
KR 20090026045 3/2009
KR 1017776 2/2011
KR 20120007241 1/2012
KR 2012046621 5/2012
KR 2012051305 5/2012
KR 20150089495 A 8/2015
RU 2061925 C1 6/1996
RU 2077411 C1 4/1997
RU 2081858 6/1997
RU 2132522 C1 6/1999
RU 2162576 C2 1/2001
RU 2166158 C1 4/2001
RU 2187433 C2 8/2002
RU 2234645 C1 8/2004
RU 2252377 5/2005
RU 2253792 C2 6/2005
RU 2349618 C2 3/2009
RU 2414288 C2 3/2011
RU 2422598 6/2011
RU 142892 7/2014
RU 2529525 C1 9/2014
RU 2571031 12/2015
SU 203707 12/1967
SU 00476407 A1 7/1975
SU 547614 5/1977
SU 648780 A1 2/1979
SU 01307186 A1 4/1987
WO 9721767 6/1997
WO 1998049506 11/1998
WO 02060576 A1 4/1999
WO 9614207 A1 4/1999
WO 9920961 A1 4/1999
WO 9920964 A1 4/1999
WO 199920964 4/1999
WO 200160598 8/2001
WO 200202987 1/2002
WO 2002052208 4/2002
WO 03072684 A1 9/2003
WO 03089729 10/2003
WO 2004010042 A1 1/2004
WO 2006045694 5/2006
WO 2006073540 A2 7/2006
WO 2007033836 A1 3/2007
WO 2007085511 8/2007
WO 2007106067 A2 9/2007
WO 2008065453 6/2008
WO 2008077741 7/2008
WO 2008118536 A2 10/2008
WO 2008122483 A2 10/2008
WO 2009013106 A2 1/2009
WO 2009112433 A1 9/2009
WO 2009147106 12/2009
WO 2010007783 A1 1/2010
WO 2010029730 3/2010
WO 2010043009 4/2010
WO 2010092627 8/2010
WO 2010127947 11/2010
WO 2010127947 A2 11/2010
WO 2011003711 1/2011
WO 2011058678 5/2011
WO 2011058678 A1 5/2011
WO 2011081498 7/2011
WO 2012023705 2/2012
WO 2012026715 3/2012
WO 2012031885 3/2012
WO 2012044001 4/2012
WO 2012043990 5/2012
WO 2012085212 6/2012
WO 2012119892 9/2012
WO 2012152646 11/2012
WO 2013116103 8/2013
WO 2013116302 8/2013
WO 2014038150 3/2014
WO 2014038150 A1 3/2014
WO 2014095542 6/2014
WO 2014121893 A1 8/2014
WO 2014184393 11/2014
WO 2014184393 A1 11/2014
WO 2013140816 A1 8/2015
WO 2016082907 A1 6/2016
WO 2017029782 A1 2/2017
WO 2020050838 3/2020

OTHER PUBLICATIONS

JP2014201873A English translation prepared Aug. 14, 2025 (Year: 2025).*

Kitchen Aid, "Refrigerator User Instructions," 120 pages, published Sep. 5, 2015.

BASF, "Balindur™ Solutions for fixing Vaccum Insulated Panels," web page, 4 pages, date unknown, http://performance-materials.basf.us/products/view/family/balindur, at least as early as Dec. 21, 2015.

BASF, "Balindur™," web page, 2 pages, date unknown, http://product-finder.basf.com/group/corporate/product-finder/en/brand/BALINDUR, at least as early as Dec. 21, 2015.

PU Solutions Elastogram, "Balindur™ masters the challenge," web page, 2 pages, date unknown, http://product-finder.basf.com/group/corporate/product-finder/en/literature-document:/Brand+Balindur-Flyer--Balindur+The+new+VIP+fixation+technology-English.pdf, Dec. 21, 2014.

Cai et al., "Generation of Metal Nanoparticles by Laser Ablation of Microspheres," J. Aerosol Sci., vol. 29, No. 5/6 (1998), pp. 627-636.

Raszewski et al., "Methods for Producing Hollow Glass Microspheres," Powerpoint, cached from Google, Jul. 2009, 6 pages.

* cited by examiner 112
230
238
342
270
250
280
340
282
120
330
380
284
332
32
234
352
334
232
236
12
28
10
20
262
216
212
266
214
22

INSULATION COMPACTION DEVICE AND METHOD FOR FORMING AN INSULATED STRUCTURE FOR AN APPLIANCE

CROSS-REFERENCE TO RELATED APPLICATIONS

This application is a continuation-in-part of U.S. patent application Ser. No. 14/961,956 filed on Dec. 8, 2015, entitled INSULATION COMPACTION DEVICE AND METHOD FOR FORMING AN INSULATED STRUCTURE FOR AN APPLIANCE, the disclosure of which is hereby incorporated herein by reference in its entirety.

BACKGROUND

The device is in the field of insulating structures for appliances, specifically, an insulating structure for an appliance having a compacted insulating media within the insulating structure.

SUMMARY

According to one aspect of the present disclosure, an insulation compaction device for installing insulation within an insulating structure of an appliance incudes an outer wrapper and an inner liner that are attached together to define the insulating structure having an insulating cavity defined therein. An insulating media is disposed within the insulating cavity. An operable piston selectively engages the insulating structure. The operable piston operates to define a selected cavity volume of the insulating cavity and a selected insulation density of the insulating media within the insulating cavity. A valve is attached to the insulating structure and defines selective communication between the insulating cavity and an exterior of the insulating structure. The valve in a passive state releases gas disposed within the insulating cavity to the exterior during operation of the operable piston. A pump mechanism is in communication with the valve. Selective operation of the pump mechanism places the valve in an active state to extract gas from the insulating cavity and define a cavity pressure of the insulating cavity. The cavity pressure is less than an equalized pressure. The operable piston and the pump mechanism are at least one of sequentially operable and simultaneously operable to define a selected piston chamber environment defined by the selected cavity volume and the cavity pressure.

According to another aspect of the present disclosure, a method for forming an insulating structure for an appliance includes forming an insulating cavity at least between an inner liner and an outer wrapper of the insulating structure. A predetermined amount of an insulating media is disposed within the insulating cavity. A gas valve is disposed within at least one of the inner liner and the outer wrapper. The gas valve defines a selective communication between the insulating cavity and an exterior of the insulating structure. A gas pump is disposed in communication with the gas valve. The gas pump is in communication with the insulating cavity via the gas valve. An operable piston is provided that is operable against the insulating structure. At least one of the operable piston and the gas pump are operated to define a selected insulating cavity environment that corresponds to a desired insulation density of the insulating media. The operable piston operates to a predetermined location relative to the insulating structure to define a selected insulating cavity volume. The gas pump is operated to define a selected insulating cavity pressure. The selected insulating cavity volume and the selected insulating cavity pressure define the selected insulating cavity environment within which the insulating media is maintained at the desired insulation density.

According to yet another aspect of the present disclosure, a method for forming an insulative member includes forming a wrapper for an insulating structure. The wrapper defines an insulating cavity. A predetermined amount of an insulating media is disposed into the insulating cavity. The insulating media has a pre-compaction density. The insulating media is modified to define a desired insulation density by applying a positive compression to and generating a negative compression within the insulating media during a simultaneous compression phase. At least the simultaneous compression phase is operated until the insulating media reaches the desired insulation density. The desired insulation density is greater than the pre compaction density. The insulating cavity is sealed to maintain the desired insulation density of the insulating media within the insulating cavity to form the insulating structure.

These and other features, advantages, and objects of the present disclosure will be further understood and appreciated by those skilled in the art by reference to the following specification, claims, and appended drawings.

DETAILED DESCRIPTION OF EMBODIMENTS

Figure 1:
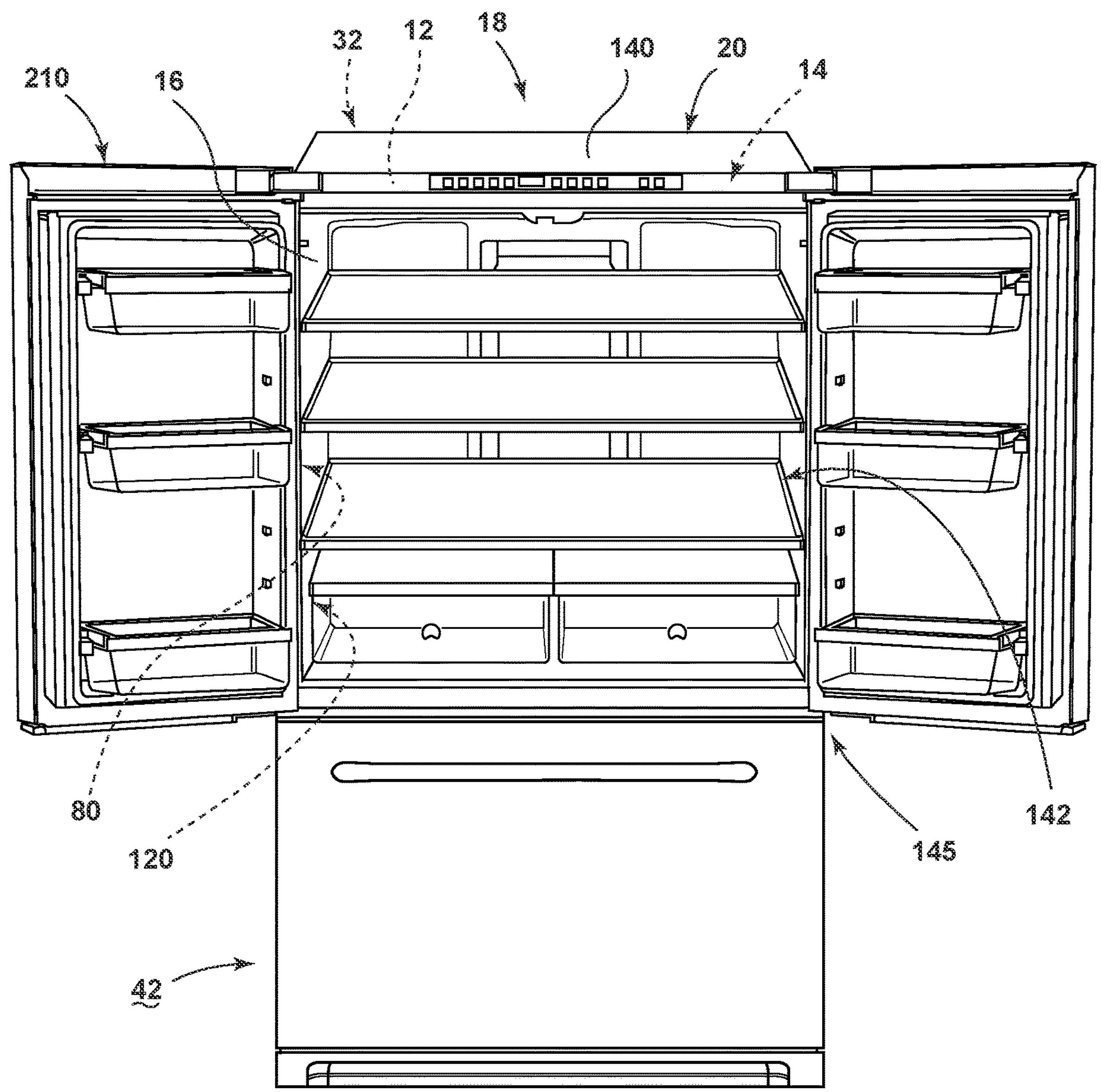
FIG. 1 is a front perspective view of an appliance incorporating an aspect of the compacted insulated structure.
Figure 3:
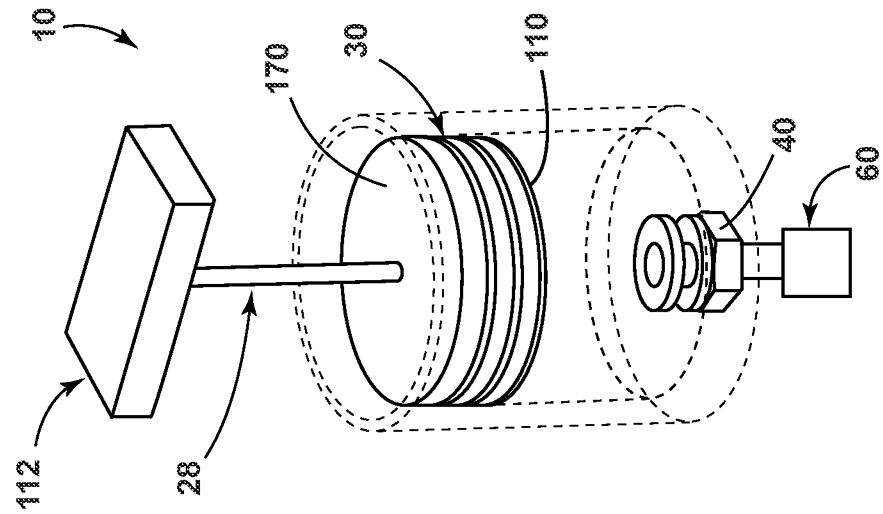
FIG. 3 is a side perspective view of the insulation compaction device of FIG. 2 looking into the internal cavity of the piston chamber.
Figure 2:
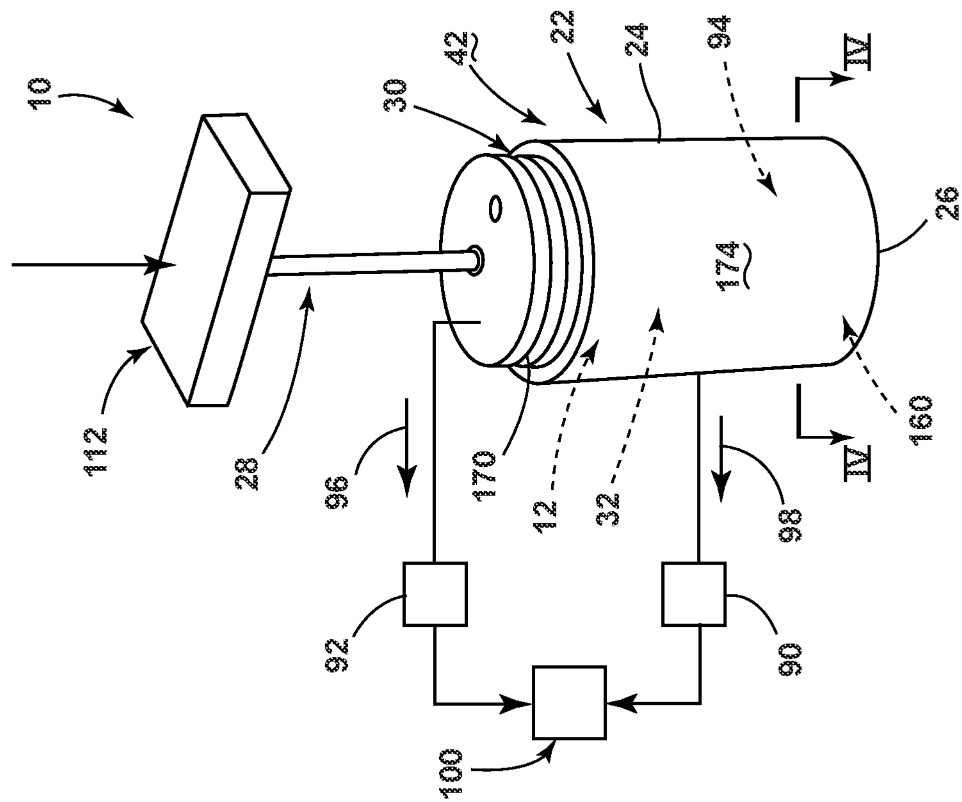
FIG. 2 is a perspective view of an exemplary insulation compaction device incorporating positive and negative compressive forces.
Figure 4:
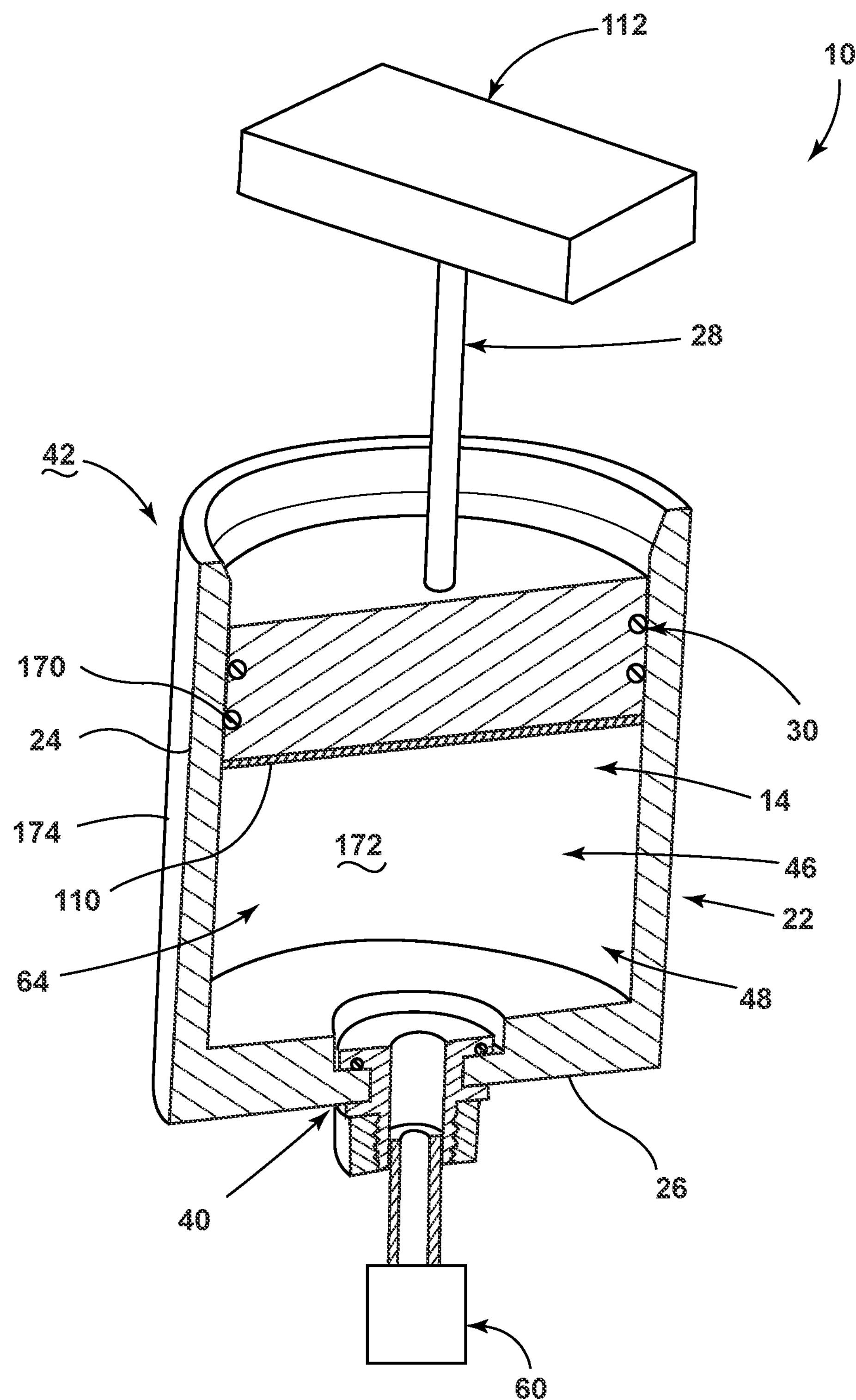
FIG. 4 is a cross-sectional view of the insulation compaction device of FIG. 2 taken along line IV-IV.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As illustrated in FIGS. 1-7, an insulation compaction device 10 can be used to increase the density of an insulating media 12 or insulating material for installation within an insulating internal cavity 14 of an appliance 18, such as that typically formed within the walls 16 of the appliance 18. Such appliances 18 can include, but are not limited to, refrigerators, freezers, dishwashers, ovens, laundry appliances, water heaters, HVAC systems, and other similar household appliances. FIGS. 2-7 exemplify various aspects of the insulation compaction device 10 for purposes of illustrating exemplary operational modes and methods of operation for aspects of the insulation compaction device 10. The insulation compaction device 10 is configured to prepare and/or dispose insulating media 12 within an insulating structure 20 of an appliance 18. The insulation compaction device 10 includes a piston chamber 22 having a sidewall 24 and a base 26 that defines an internal cavity 14 of the piston chamber 22. An operable piston 28 selectively engages the sidewall 24 wherein engagement between the operable piston 28 and the sidewall 24 defines a hermetic seal 30 between the operable piston 28 and the piston chamber 22. It is contemplated that the operable piston 28 is operable to define a selected chamber volume 32 of the internal cavity 14 defined between the operable piston 28 and piston chamber 22. The selected chamber volume 32 can be defined by one or more of various design, performance, and/or dimensional parameters of the insulating structure 20 for the appliance 18.

Referring again to aspects of the device as exemplified in FIGS. 2-7, a valve 40 is positioned proximate the base 26 of the piston chamber 22, where the valve 40 defines selective communication between the internal cavity 14 and the exterior 42 of the piston chamber 22. The valve 40 is selectively operable in a passive state 44 to release gas 46 disposed within the piston chamber 22 to the exterior 42. The passive state 44 of the valve 40 is defined by an equalized pressure 48 within the internal cavity 14 of the piston chamber 22 during operation of the operable piston 28 to define the selected chamber volume 32. In this manner, as the operable piston 28 moves to define the selected chamber volume 32, internal pressure within the internal cavity 14 increases due to the decrease in volume of the internal cavity 14. This increased pressure is released through the passive expression of gas 46 through the valve 40. The valve 40 is in a passive state 44 to provide for substantially equal pressure within the internal cavity 14 when compared with the exterior 42 of the piston chamber 22.

Referring again to FIGS. 2-7, a pump mechanism 60 is placed in communication with the piston chamber 22 via the valve 40 to define an active state 62 of the valve 40. Selective operation of the pump mechanism 60 places the valve 40 in the active state 62 to define a chamber pressure 64 of the internal cavity 14. It is contemplated that the chamber pressure 64 is different from, and typically less than, the equalized pressure 48. In this manner, operation of the pump mechanism 60, such as a gas pump, serves to create a low pressure region 66 within the internal cavity 14. This low pressure region 66 can be defined by an at least partial vacuum within the internal cavity 14 of the piston chamber 22. It is contemplated that the operable piston 28 and the pump mechanism 60 can be individually operable such that the operable piston 28 operates separately from the pump mechanism 60, either in a sequential pattern 70 or through operation of only one of the operable piston 28 and the pump mechanism 60. Alternatively, the operable piston 28 and the pump mechanism 60 can operate in a simultaneous pattern 72, such that a positive compressive force 74 of the operable piston 28 can be exerted against an insulating media 12. At the same time, a low pressure or negative compressive force 76 can be exerted against the insulating media 12 by the operation of the pump mechanism 60, to remove gas 46 from the internal cavity 14 through the valve 40 in the active state 62. It is contemplated that operation of the operable piston 28 and the pump mechanism 60, either independently, in the sequential pattern 70 or simultaneous pattern 72, serves to define a selected piston chamber environment 80 defined by the selected chamber volume 32 and one of the equalized pressure 48 and the chamber pressure 64.

Referring again to FIGS. 2-7, the insulation compaction device 10 can also include a pressure sensor 90 that is placed in communication with the internal cavity 14 to measure the chamber pressure 64 within the internal cavity 14. It is contemplated that the pressure sensor 90 can be located proximate the valve 40, proximate the pump mechanism 60, or at an external location while in communication with the internal cavity 14. The insulation compaction device 10 can also include a position sensor 92 in communication with the operable piston 28, and the piston chamber 22. The position sensor 92 is configured to measure the selected chamber volume 32 where movements of the operable piston 28 vary the amount of space or volume defined within the internal cavity 14. The pressure sensor 90 and the position sensor 92 can cooperate to communicate a current piston chamber environment 94 of the internal cavity 14.

According to the various embodiments, the current piston chamber environment 94 can be defined as the current volume 96 of the internal cavity 14 during operation of the operable piston 28 and also a current pressure 98 defined within the internal cavity 14 during operation of the valve 40 during the passive state 44 and/or the active state 62 of the valve 40 as the operable piston 28 and pump mechanism 60 operate to define the selected piston chamber environment 80. The pressure sensor 90 and position sensor 92 of the insulation compaction device 10 can communicate the pressure and position data to a processor 100, where the processor 100 calculates the current pressure 98 and the current volume 96. These calculations are combined to determine the current piston chamber environment 94. Once the current piston chamber environment 94 reaches the selected piston chamber environment 80, the operation of the operable piston 28 and the pump mechanism 60 can be interrupted such that the selected piston chamber environment 80 can be maintained within the internal cavity 14 until such time as the piston chamber 22 can be sealed. Once the piston chamber 22 is sealed, the operable piston 28 can be disengaged from the sidewall 24 and the pump mechanism 60 can be disengaged from the valve 40. In this manner, the selected piston chamber environment 80 can be maintained within the internal cavity 14 after manufacture and during use of the appliance 18.

Referring again to FIGS. 2-7, the operable piston 28 can include a back panel 110 engaged thereto. In such an embodiment, operation of the operable piston 28 locates the back panel 110 relative to the sidewall 24. Accordingly, the operable piston 28 moves to define the selected chamber volume 32 of the internal cavity 14 and, as a consequence, positions the back wall 16 relative to the sidewall 24. Once in the proper position to define the selected piston chamber environment 80, the sidewall 24 and back wall 16 can be engaged to one another through crimping, welding, fastening, adhesives, combinations thereof, and other attachment mechanisms to secure the back panel 110 to the sidewall 24 in order to maintain the selected piston chamber environment 80 within the internal cavity 14. In order to operate the operable piston 28 toward the position defining the selected chamber volume 32 of the internal cavity 14, the operable piston 28 can be moved by mechanical press 112, having various operational mechanisms that can include, but are not limited to, hydraulics, pneumatics, mechanical drives, screw drives, combinations thereof, and other similar operating mechanisms. The engagement between the back panel 110 and the sidewall 24 can define a sealed engagement, where the back panel 110 and sidewall 24 are attached to one another to define a hermetic seal 30.

Referring again to FIGS. 2-7, it is contemplated that the insulating media 12 can be placed within the internal cavity 14 before placing the operable piston 28 against the sidewall 24 of the piston chamber 22. It is also contemplated that a known amount of the insulating media 12 can be placed within the internal cavity 14 such that calculations based upon the selected chamber volume 32 and the chamber pressure 64 can be used to calculate a density of the one or more insulating materials that make up the insulating media 12. In this manner, the density of the insulating media 12 can be modified through operation of the operable piston 28 and the pump mechanism 60 in order to modify the density of the insulating media 12 to be substantially equal to a desired insulation density 120.

In the various embodiments, the desired insulation density 120 can be a density determined to provide a certain level of thermal and/or acoustical insulating properties to the insulating structure 20 of the appliance 18. It is further contemplated that the desired insulation density 120 can be determined during the design of the insulating structure 20 by incorporating various parameters, where such parameters can include, but are not limited to, cost of materials, production time, efficiency, performance, various dimensional parameters, combinations thereof and other similar parameters and considerations that may affect the design of a particular appliance 18 or an insulating structure 20 therefor.

Figure 5:
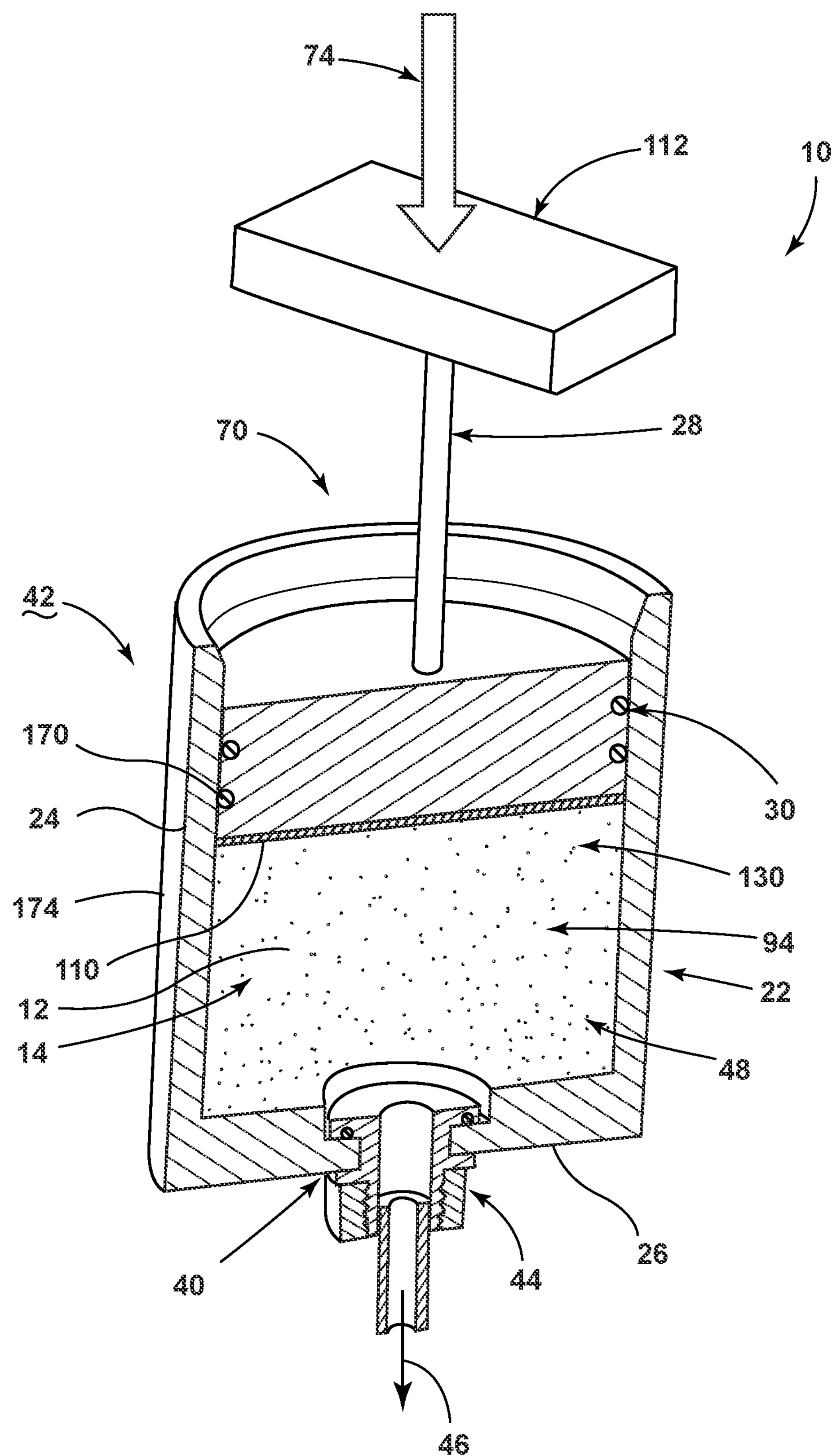
FIG. 5 is a cross-sectional view of an aspect of the insulation compaction device showing the gas valve operating in a passive state.
Figure 6:
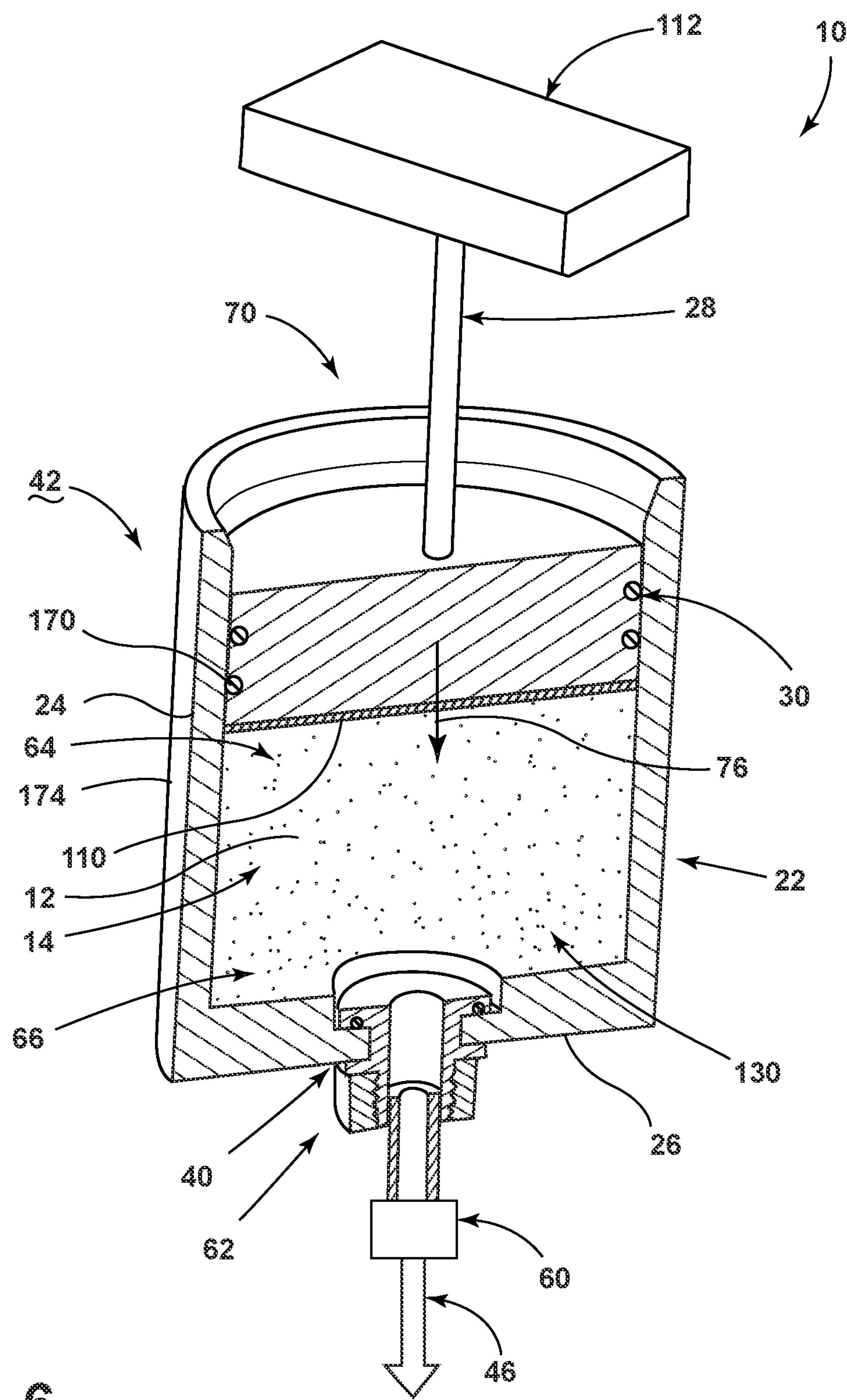
FIG. 6 is a cross-sectional view of the insulation compaction device of FIG. 5 showing the gas valve operating in an active state.

Referring now to FIGS. 5 and 6, it is contemplated that the insulation compaction device 10 can operate such that the operable piston 28 and the pump mechanism 60 operate in a sequential pattern 70 and/or where only one of the operable piston 28 and the pump mechanism 60 operate to define the selected piston chamber environment 80. After the predetermined amount of the insulating media 12 is disposed within the internal cavity 14, the movement of the operable piston 28 to the selected chamber volume 32 can define a compressed state 130 of the insulating media 12 within the selected piston chamber environment 80. It is contemplated that the density of the insulating media 12 within the selected piston chamber environment 80 of the internal cavity 14 can correspond to the desired insulation density 120. As described above, where only the operable piston 28 is used to define the selected piston chamber environment 80, it is contemplated that the valve 40 operates in the passive state 44 to substantially equalize the pressure within the internal cavity 14, as related to the ambient air pressure around the exterior 42 of the piston chamber 22. In the passive state 44, gas 46 from within the internal cavity 14 is expelled from the internal cavity 14 via the valve 40 as the operable piston 28 moves to shrink the size of the internal cavity 14. It is also contemplated that where the operable piston 28 moves away from the base 26 of the piston chamber 22, thereby expanding the volume of the internal cavity 14, the valve 40 can be operated to allow the entry of gas 46 from the exterior 42 of the piston chamber 22 to again equalize the pressure between the internal cavity 14 and areas external to the piston chamber 22.

Referring now to FIG. 6, where the predetermined amount of insulating media 12 is disposed within the internal cavity 14, operation of the valve 40 in the active state 62, through operation of the pump mechanism 60, can serve to define the chamber pressure 64 of the internal cavity 14, corresponding to a low pressure state of the insulating media 12. This low pressure state of the insulating media 12 is defined within the selected piston chamber environment 80 that is set through operation of the pump mechanism 60 and the valve 40 in the active state 62. As discussed above, the selected piston chamber environment 80 includes the selected chamber volume 32 and the chamber pressure 64 that corresponds to the desired insulation density 120 of the insulating media 12 disposed within the internal cavity 14. During operation of the pump mechanism 60, by itself, the pump mechanism 60 draws gas 46 from the internal cavity 14 and expels this gas 46 to areas external of the piston chamber 22. It is contemplated that the creation of the low pressure areas within the internal cavity 14 through operation of the pump mechanism 60 can cause the operable piston 28 to move downward to passively equalize the pressure between the internal cavity 14 and areas external to the piston chamber 22. In such an embodiment, it is contemplated that the operable piston 28 can be placed in a fixed position that corresponds to the selected chamber volume 32 so that operation of the pump mechanism 60 can define the low pressure region 66 within the internal cavity 14 of the piston chamber 22. In this manner, operation of the pump mechanism 60 can serve to achieve the desired insulation density 120 of the insulating media 12 within the internal cavity 14.

According to various embodiments, it is contemplated that the pump mechanism 60 and valve 40 can work in conjunction with an insulating gas injection mechanism. In such an embodiment, as the pump mechanism 60 operates to draw gas 46 from the internal cavity 14 through the valve 40, a separate insulating gas injector injects an insulating gas into the internal cavity 14. In this manner, the expelled gas is replaced by an insulating gas. It is contemplated that the insulating gas can be held within the internal cavity 14 at the equalized pressure 48 or a different chamber pressure 64. It is further contemplated that the insulating gas can be any one of various insulating gasses that can include, but are not limited to, neon, carbon dioxide, xenon, krypton, combinations thereof and other similar insulating gasses.

Figure 7:
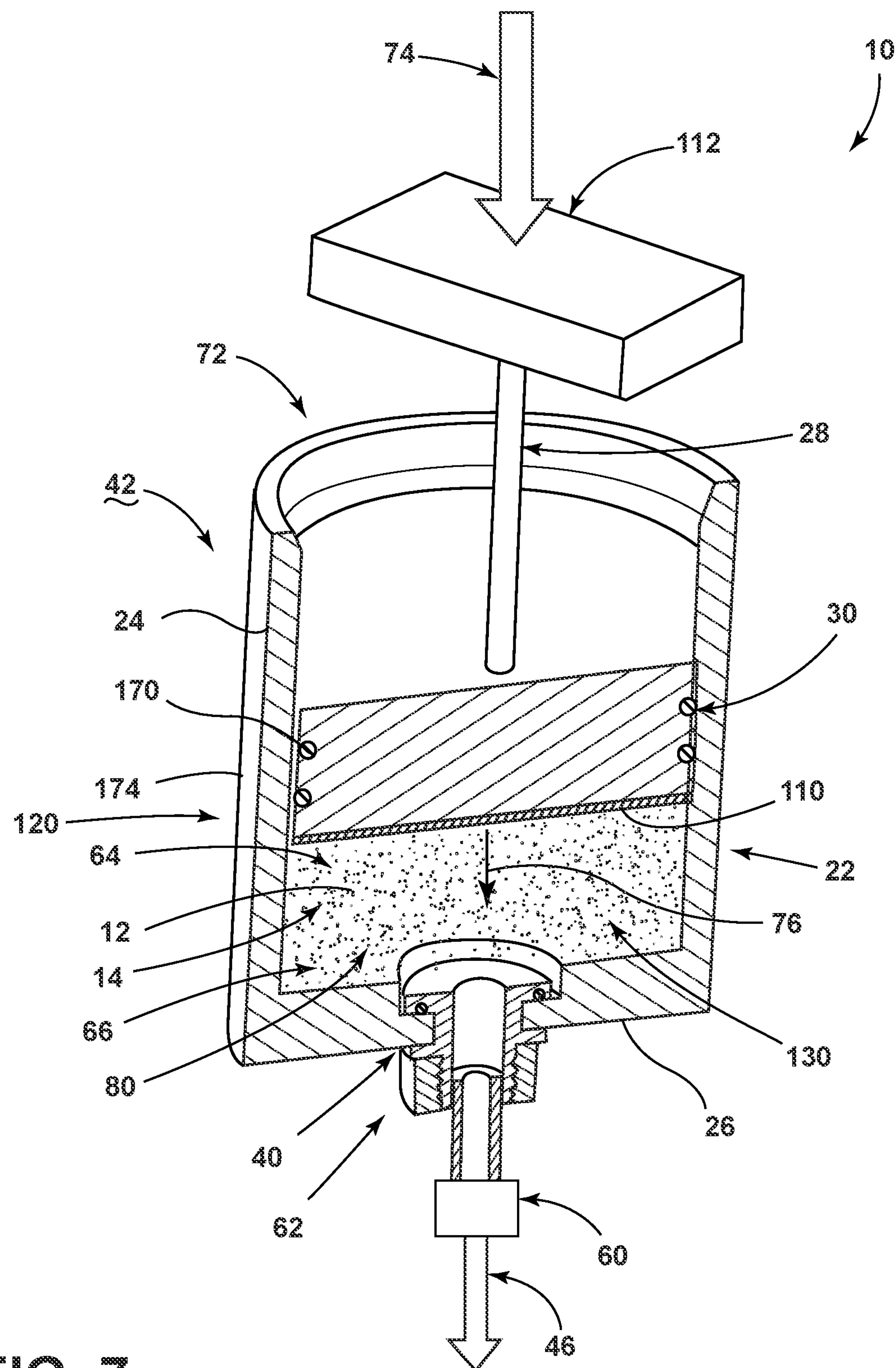
FIG. 7 is a cross-sectional view of the insulation compaction device of FIG. 5 showing simultaneous operation of the piston and the gas valve.

Referring now to FIG. 7, as discussed above, it is contemplated that the operable piston 28 and the pump mechanism 60 can operate in a simultaneous pattern 72 to achieve the selected piston chamber environment 80, and, in turn, the desired insulation density 120 of the insulating media 12 within the internal cavity 14. Accordingly, the operable piston 28 can be moved toward a position that defines the selected chamber volume 32 and, at the same time, the pump mechanism 60 can be activated to draw gas 46 from the internal cavity 14 to create the low pressure region 66 of the insulating media 12 within the internal cavity 14. It has been discovered that sequential use of the positive compressive force 74, such as that provided by the operable piston 28, and the generation of a low pressure region 66 to create a negative compressive force 76, through operation of the pump mechanism 60, can efficiently achieve the desired insulation density 120 of the insulating media 12.

Additionally, simultaneous operation of the operable piston 28 and the pump mechanism 60 to achieve the desired insulation density 120 also provides an efficient mechanism for achieving a desired selected piston chamber environment 80, and in turn, the desired insulation density 120 of the insulating media 12 within the internal cavity 14. It is also contemplated that various phases of operation of the sequential and simultaneous patterns 72 for the insulation compaction device 10 can be implemented during formation of the insulating structure 20. These phases and patterns can include independent phases, sequential patterns 70, and simultaneous patterns 72 of operation of the insulation compaction device 10.

By way of example and not limitation, operation of the pump mechanism 60 removes gas 46 from the internal cavity 14. As this gas 46 is removed, the operation of the operable piston 28 can more effectively compress the insulating media 12 since there is less resistance, push back, rebound or other resistive force to oppose the positive compressive force 74 exerted by the operable piston 28. Accordingly, achievement of the selected piston chamber environment 80 and the desired insulation density 120 can be a more efficient process.

According to the various embodiments as exemplified in FIGS. 5 and 6, the independent phase of operation of the insulation compaction device 10 can be defined by operation of only one of the operable piston 28 and the pump mechanism 60 to define the selected piston chamber environment 80, and, in turn, the desired insulation density 120 of the insulating media 12 within the internal cavity 14. The sequential pattern 70 of operation of the insulation compaction device 10 can be defined by alternate operation of the operable piston 28 and the pump mechanism 60 to define the appropriate desired insulation density 120 for the insulating media 12.

Referring again to FIG. 7, the simultaneous pattern 72 of operation for the insulation compaction device 10, as discussed above, can be defined by simultaneous operation of the operable piston 28 and the pump mechanism 60 to define the desired insulation density 120 within the internal cavity 14 of the piston chamber 22. These phases and patterns can be implemented in a predetermined pattern during operation of the insulation compaction device 10 where the operation shifts between the sequential pattern 70 to the simultaneous pattern 72. It is contemplated that the use of the individual, sequential, and simultaneous patterns 72 of operation for the insulation compaction device 10 can be determined based upon several factors. Such factors can include, but are not limited to, the type of appliance, the size of the piston chamber 22, the thickness of the internal cavity 14, the composition of the insulating media 12, the desired insulation density 120, combinations thereof, and other similar factors.

According to the various embodiments, it is contemplated that the insulating media 12 can include various compositions and combinations of materials that can be used in conjunction with the insulation compaction device 10 for achieving the desired insulation density 120 within the internal cavity 14 of the piston chamber 22. Such materials can include silica, fumed silica, rice husk, glass spheres of varying size, and other similar primary insulating components. It is also contemplated that the insulating media 12 can include various getters, dessicants, opacifiers, carbon black, and other similar insulating compositions. These various compositions can be combined in varying combinations and proportions to achieve the desired characteristics for the insulating media 12 that, when used with the insulation compaction device 10, produces the desired insulation density 120 of the insulating media 12 within the internal cavity 14.

According to the various embodiments, various configurations of the insulating media 12 can have varying reactions to the positive and negative compressive forces 74, 76 exerted thereon. Certain insulating media 12 can experience varying degrees of rebound, where the insulating media 12 expands back toward its pre-compaction density 160 after being placed in the compressed state 130. In such situations, the back panel 110 of the insulating structure 20 should be able to be sealed to the sidewall 24 while the operable piston 28 defines the selected chamber volume 32. Release of the operable piston 28 may result in the rebound of the insulating media 12, forcing the back panel 110 away from this piston such that the selected chamber volume 32 and the desired insulation density 120 may not be achieved.

Figure 8:
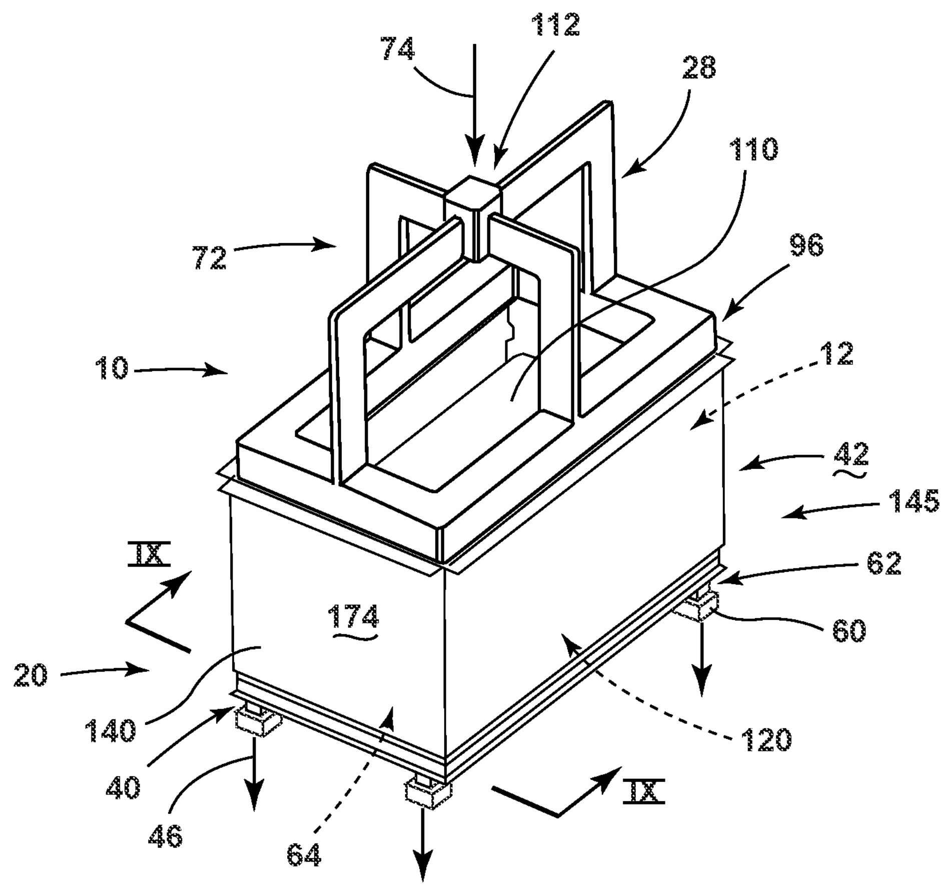
FIG. 8 is a top perspective view of an exemplary insulating structure for an appliance incorporating an aspect of the insulation compaction device.
Figure 9:
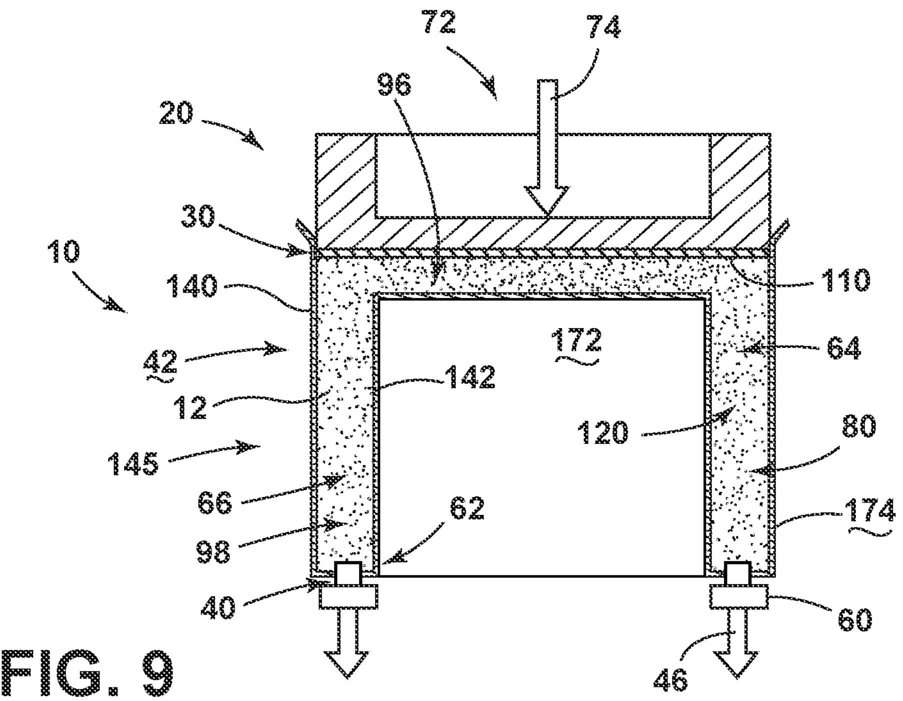
FIG. 9 is a cross-sectional view of the insulation compaction device of FIG. 8 taken along line IX-IX.
Figure 10:
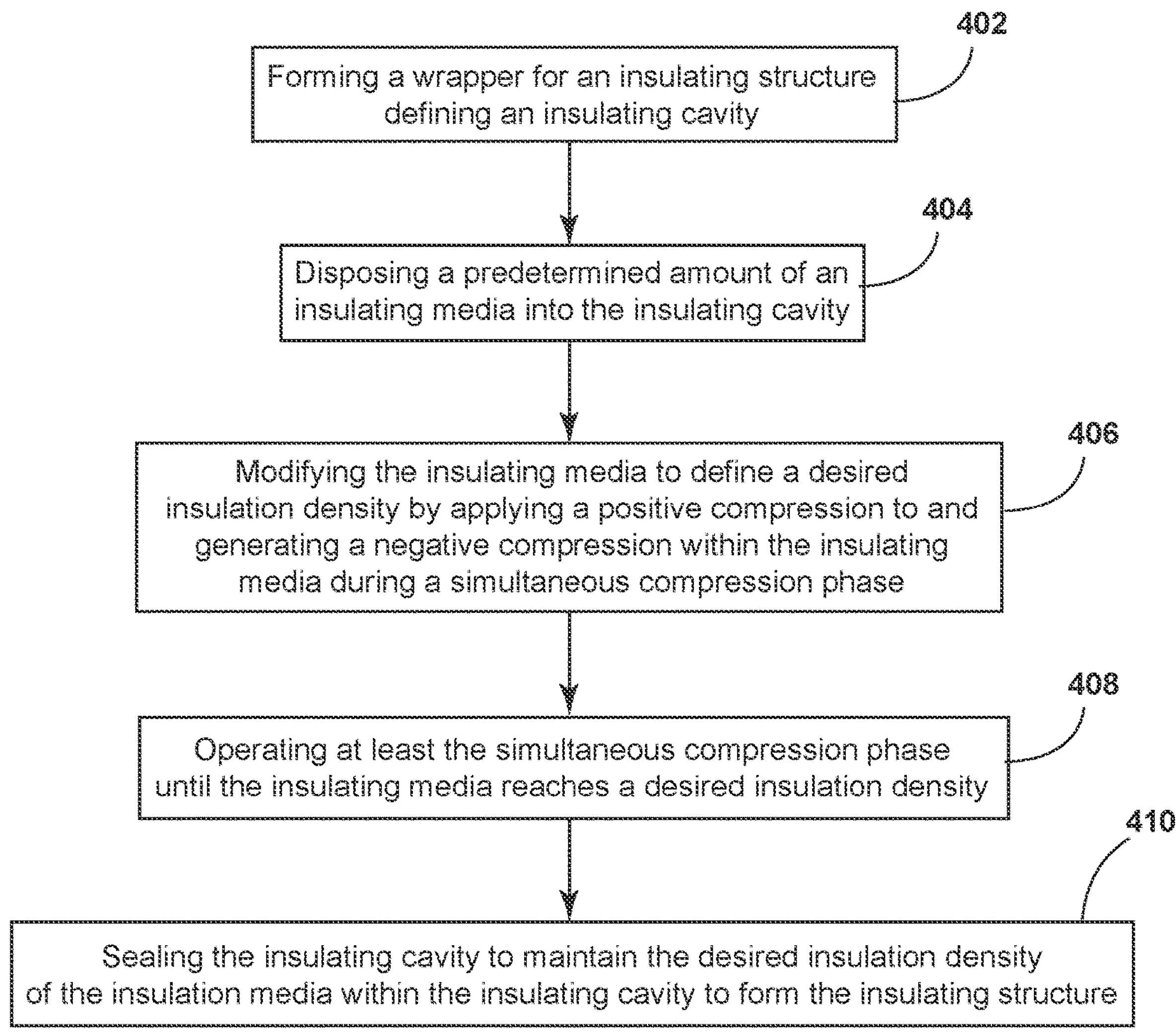
FIG. 10 is a schematic flow diagram illustrating an exemplary method for forming an insulative member.
Figure 11:
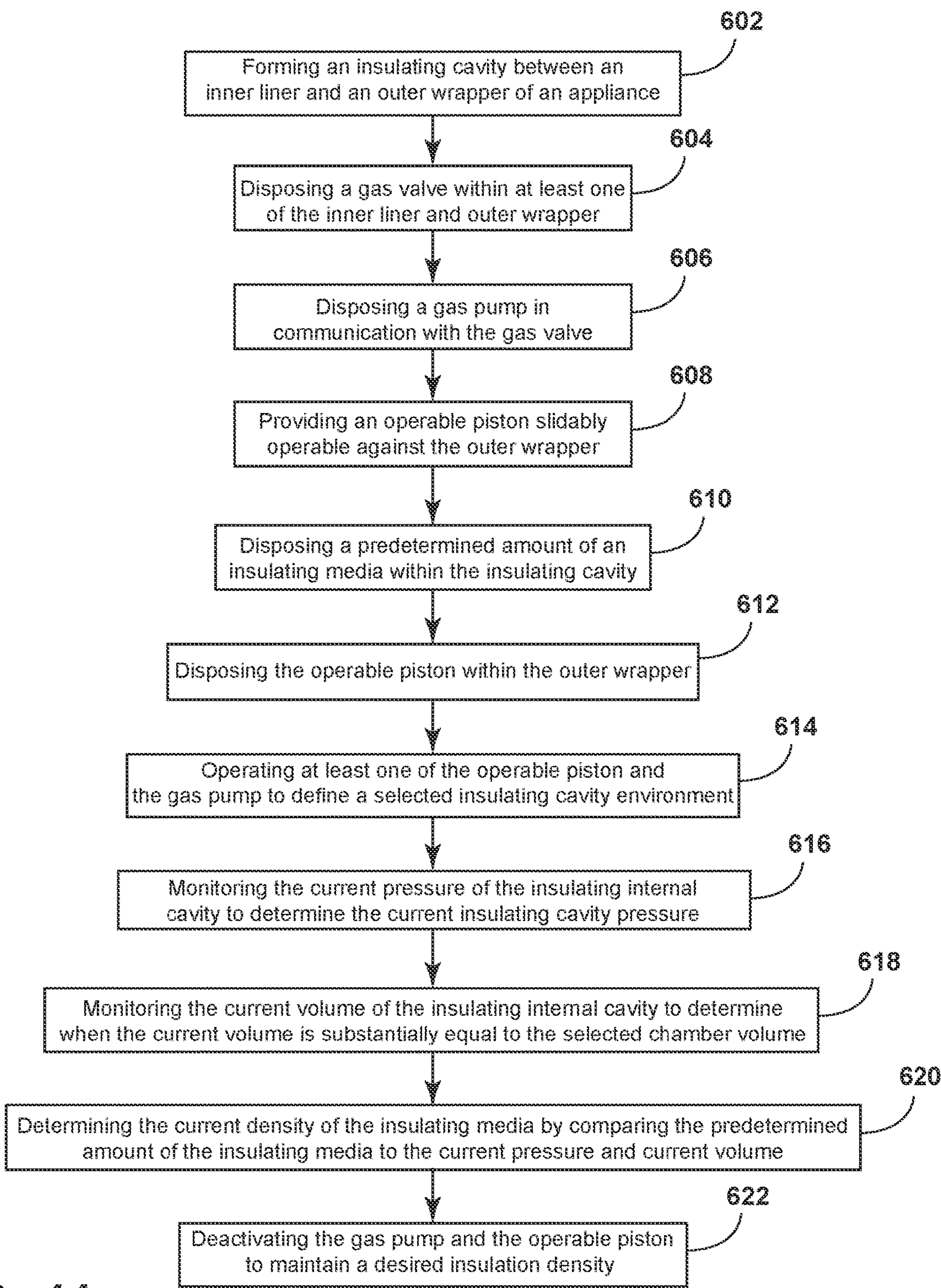
FIG. 11 is a schematic flow diagram illustrating an exemplary method for forming an appliance cabinet utilizing aspects of the insulation compaction device.
Figure 12:
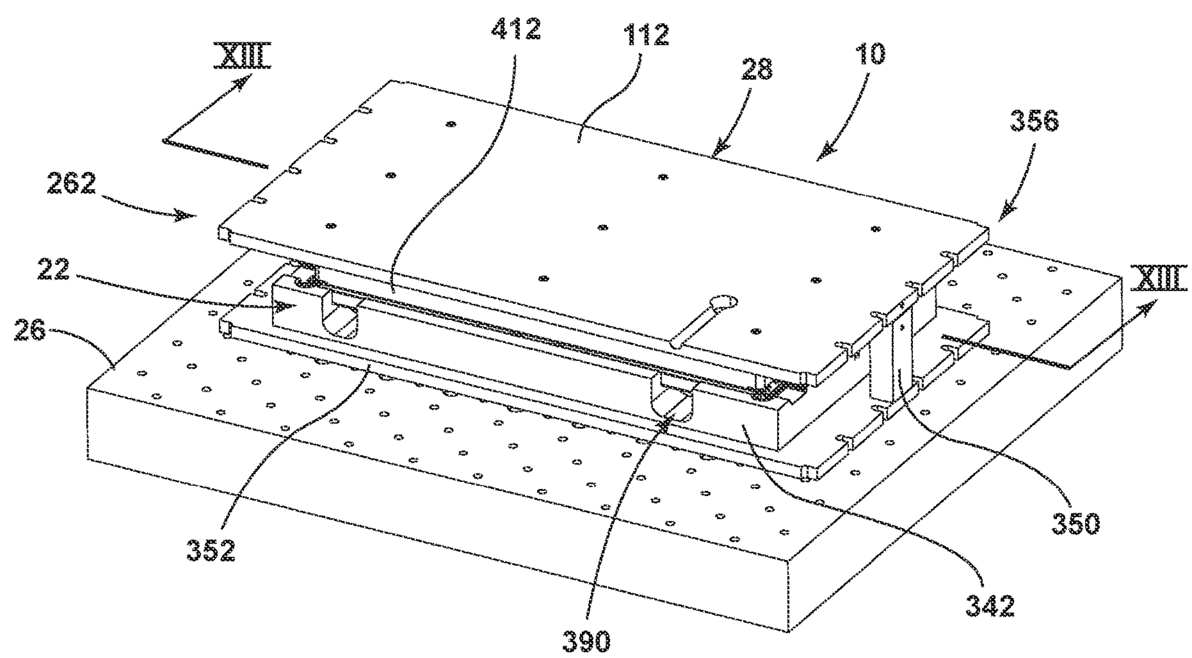
FIG. 12 is a perspective view of a compaction device for forming an insulating structure according to an aspect of the device.
Figure 13:
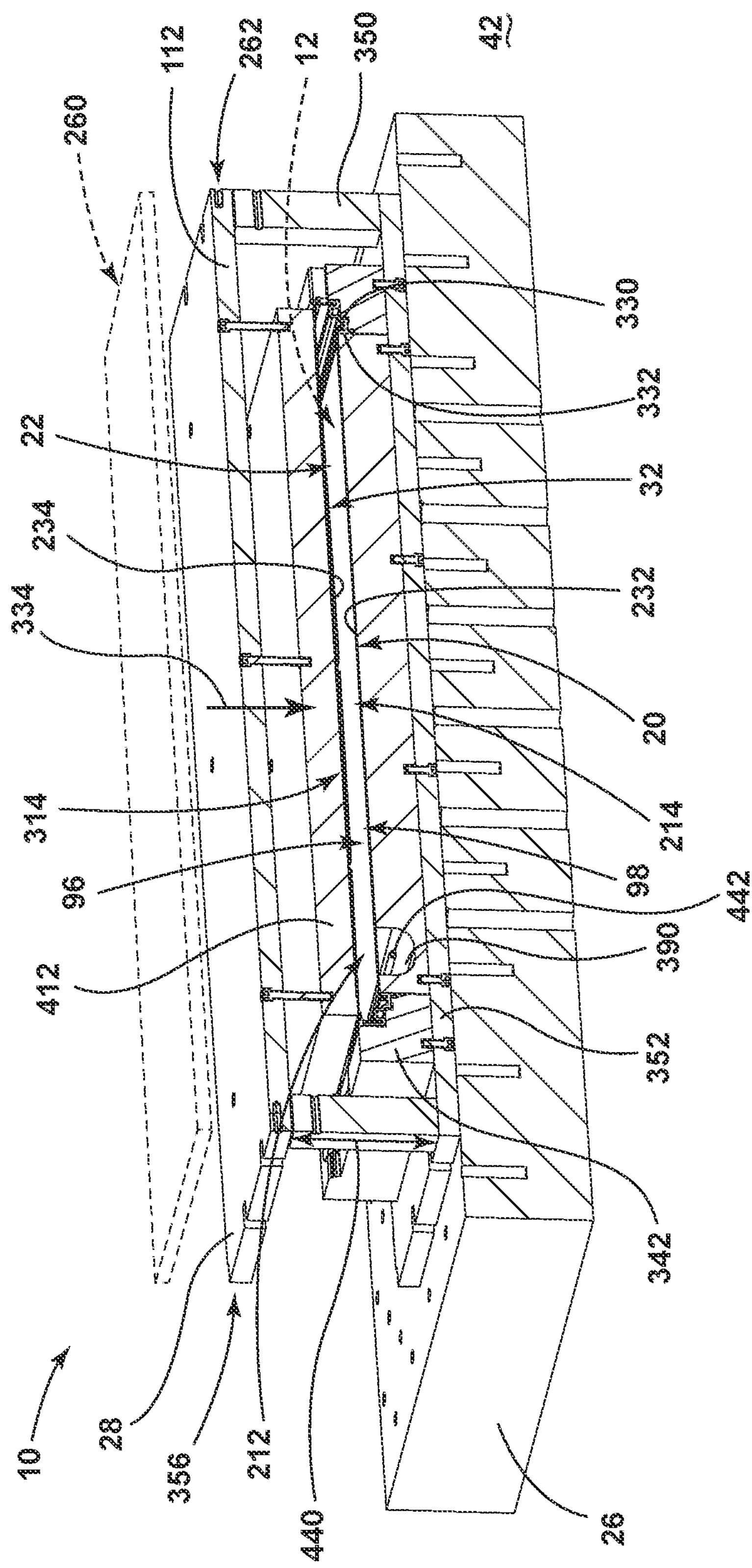
FIG. 13 is a cross-sectional view of the insulation compaction device of FIG. 12, taken along line XIII-XIII.

Referring now to FIGS. 8 and 9, it is contemplated that the piston chamber 22 for the insulation compaction device 10 can include an outer wrapper 140 and an inner liner 142 that define walls 16 of an insulating structure 20 for an appliance 18. The internal cavity 14 of the piston chamber 22 can be defined by the insulating internal cavity 14 within the walls 16 defined between the outer wrapper 140 and inner liner 142. It is contemplated that the embodiments exemplified in FIGS. 8 and 9 provide an aspect of the insulation compaction device 10 that incorporates the same operational aspects as those exemplified in FIGS. 2-7. In utilizing the insulation compaction device 10 within an insulating structure 20, such as a cabinet 145 for an appliance 18, the insulating media 12 can be disposed directly within the insulating internal cavity 14 defined between the outer wrapper 140 and inner liner 142 of the insulating structure 20 of the appliance 18. Accordingly, it is not necessary for an independent insulating structure 20, such as an insulating panel, to be manufactured and then later installed within the cabinet 145 of the appliance 18.

According to various embodiments, it is contemplated that the insulating media 12 can be disposed directly into the internal cavity 14 defined within the walls 16 of the insulating structure 20 and the operable piston 28, which includes the back panel 110 of the insulating structure 20, can be pressed downward to define the selected chamber volume 32 within the insulating internal cavity 14 of the walls 16 of the insulating structure 20. One or more valves 40 of the insulation compaction device 10 can be disposed within at least one of the outer wrapper 140 and inner liner 142, where the valves 40 can be connected to one or more pump mechanisms 60, to operate in the passive state 44 or the active state 62, to define the selected piston chamber environment 80 within the insulating internal cavity 14 of the insulating structure 20 of the appliance 18. Once the insulating media 12 is disposed within the insulating internal cavity 14 within the walls 16 of the insulating structure 20, the operable piston 28, having the back panel 110 of the insulating structure 20, can be disposed into engagement with the outer wrapper 140 of the insulating structure 20 to define a hermetic seal 30 between the back panel 110 and the outer wrapper 140. This hermetic seal 30 between the back panel 110 and the outer wrapper 140 allows the pump mechanism 60 to operate the valve 40 in the active state 62 to define a low pressure region 66 of an insulating media 12 within the insulating space of the insulating structure 20.

As discussed above, the operable piston 28 and the pump mechanism 60 of the insulation compaction device 10 can operate to form the insulating structure 20 through independent operation or operation of the sequential and/or simultaneous patterns 70, 72, and in varying combinations of these patterns, to generate the desired insulation density 120 of the insulating media 12 within the insulating internal cavity 14. Once the desired insulation density 120 is achieved, the back panel 110 can be sealed to the outer wrapper 140 to form a hermetic seal 30 between the back panel 110 and outer wrapper 140 to contain the selected piston chamber environment 80 within the internal cavity 14 and maintain the desired insulation density 120 of the insulative material within the selected piston chamber environment 80.

According to the various embodiments, it is contemplated that the use of the insulation compaction device 10 in combination with the insulating structure 20 of the appliance 18 can eliminate various steps of forming separate insulative panels or insulative components that are installed as separate pieces or a series of components within the insulating structure 20 of the appliance 18. Additionally, because the outer wrapper 140, inner liner 142, and back panel 110 can be sealed together to form a hermetic seal 30, various barrier films and internal sealing layers may not be necessary to maintain the desired insulation density 120 within the insulating internal cavity 14 of the insulating structure 20. It is contemplated that the outer wrapper 140, inner liner 142, and back panel 110 can be made of various materials that can include, but are not limited to, metal, metal alloy, polymer, composite materials, combinations thereof, and other similar materials that can create a hermetic seal 30 when bonded together to form the insulating structure 20 of the appliance 18.

According to the various embodiments, it is contemplated that the various aspects of the insulation compaction device 10 can be used to create various insulating structures 20. As discussed above, these insulating structures 20 can include a structural cabinet 145 for an appliance 18, where the insulating media 12 is directly disposed between the inner liner 142 and outer wrapper 140. It is also contemplated that the insulation compaction device 10 can be used to create smaller insulating units, such as insulating panels, that can be separately installed within a cabinet 145 of an appliance 18 to define an insulating structure 20 for the appliance 18.

Referring now to FIGS. 2-10, having described various aspects of the insulation compaction device 10, a method 400 for an aspect of forming an insulative member is described. The method 400 can include forming an outer wrapper 140 for an insulating structure 20 (step 402). It is contemplated that the outer wrapper 140 can define an insulating internal cavity 14 therein. After the outer wrapper 140 is formed, a predetermined amount of an insulating media 12 can be disposed within the insulating internal cavity 14 (step 404). It is contemplated that the insulating media 12 can have a pre-compaction density 160 that is defined within the insulating media 12 before any compressive forces of the operable piston 28 and the pump mechanism 60 are exerted thereon. According to various embodiments, the insulating media 12 can go through various compaction steps before being disposed within the insulating internal cavity 14 of the insulating media 12. Such compaction steps can be used to alter the physical composition of the insulating media 12 to define various particle sizes and compression strengths of the insulating media 12. Once the insulating media 12 is disposed within the insulating cavity, the insulating media 12 can be modified to define a desired insulation density 120 by applying a positive compressive force 74 to and generating a negative compressive force 76 within the insulating media 12 during a simultaneous pattern 72 of compression, or a simultaneous phase (step 406). As discussed above, the positive compressive force 74 applied to the insulating media 12 can be applied through the operation of the operable piston 28 to place the downward compressive force on the insulating media 12. It is contemplated that the operable piston 28 can include at least one sealing member 170 that is configured to engage the inner surface 172, outer surface 174, or both, of the outer wrapper 140. This engagement between the sealing member 170 of the operable piston 28 and the inner and/or outer surface 174 of the wrapper defines a hermetic seal 30 formed between the operable piston 28 and the wrapper of the insulating structure 20. This sealing engagement can serve to provide for the simultaneous pattern 72 of operation described herein.

Referring again to FIGS. 2-10, the operation of at least the simultaneous pattern 72 of the insulation compaction device 10 takes place until the insulating media 12 reaches the desired insulation density 120 (step 408). The desired insulation density 120 is typically greater than the pre-compaction density 160, such that application of the positive compression and negative compression serves to densify the insulating media 12. As discussed above, it is contemplated that the insulation compaction device 10 can include the simultaneous pattern 72, the sequential pattern 70, and independent patterns of operation that can work in various phases, sequences, and configurations to achieve the desired insulation density 120 of the insulating media 12.

As exemplified in FIGS. 1-10, once the desired insulation density 120 is achieved, the internal cavity 14 can be sealed to maintain the desired insulation density 120 of the insulating media 12, within the internal cavity 14 to form the insulating structure 20 (step 410).

According to the various embodiments, it is contemplated that the insulating structure 20 can be an appliance cabinet 145, where the insulating media 12 is disposed directly within the insulating internal cavity 14 of an appliance cabinet 145. It is also contemplated that the insulating structure 20 can be a separate insulating panel that can be installed as a unitary piece, or a series of panels, within a separate appliance cabinet 145. The use of a direct deposition of insulating material within the appliance cabinet 145 versus the installation of a premanufactured insulating member may depend upon the design of the appliance 18 and the specific parameters desired for the design and operation of the appliance 18.

Referring now to FIGS. 2-9 and 11, a method 600 for forming an aspect of an appliance cabinet 145 is also disclosed. Such a method 600 can include forming an internal cavity 14 between an inner liner 142 and outer wrapper 140 of an appliance 18 (step 602). As discussed above, the outer wrapper 140 and inner liner 142 can define walls 16 of an appliance cabinet 145 and the insulating internal cavity 14 can be at least partially defined between the outer wrapper 140 and inner liner 142. A gas valve 40 can be disposed within at least one of the inner liner 142 and outer wrapper 140 (step 604). As discussed above, it is contemplated that the gas valve 40 defines a selective communication between the insulating cavity and the exterior 42 of the appliance 18. Once the valve 40 is installed, a gas pump can be disposed in communication with the gas valve 40 (step 606). The connection of the gas pump with the gas valve 40 can place the gas pump in communication with the insulating internal cavity 14 via the gas valve 40.

Referring again to FIGS. 2-9 and 11, an operable piston 28 can be provided, where the operable piston 28 is slidably operable against the outer wrapper 140 (step 608). Selective operation between the operable piston 28 and the outer wrapper 140 can define a hermetic seal 30. It is contemplated that the operable piston 28 can engage at least one of an inner surface 172 and an outer surface 174 of the outer wrapper 140. The engagement between the operable piston 28 and the outer wrapper 140 can depend upon the method of operation of the insulation compaction device 10. The operable piston 28 engaging the inner surface 172 of the outer wrapper 140 can serve to at least partially prevent inward deflection of the outer wrapper 140 during operation of the gas pump to define the low pressure state of the insulating media 12 within the insulating internal cavity 14.

Conversely, engagement of the operable piston 28 with an outer surface 174 of the outer wrapper 140 can serve to prevent outward deflection of the outer wrapper 140 during operation of the operable piston 28. In various embodiments, it is contemplated that the operable piston 28 can engage both the inner and outer surfaces 172, 174 of the outer wrapper 140. The various engagements between the operable piston 28 and the outer wrapper 140 can also include one or more sealing members 170, disposed within the operable piston 28 or adjacent to the operable piston 28 such that when the desired insulation density 120 of the insulating media 12 is achieved, the one or more sealing members 170 can hermetically seal the internal cavity 14 while the operable piston 28 is in the desired position, to maintain the desired insulation density 120 of the insulating media 12.

Figure 19:
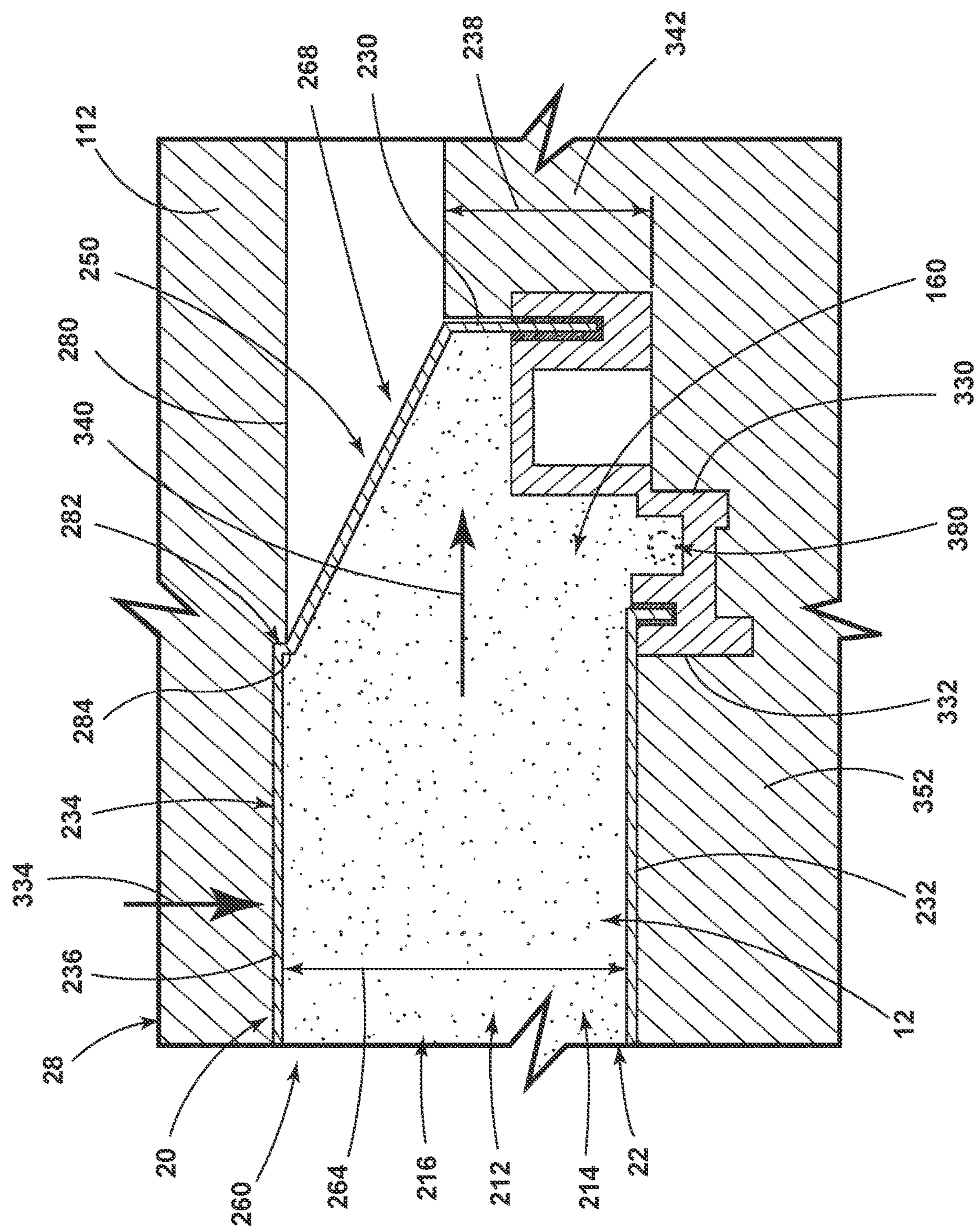
FIG. 19 is a schematic cross-sectional view of the insulating structure in the offset position before the operable piston is activated.
Figure 20:
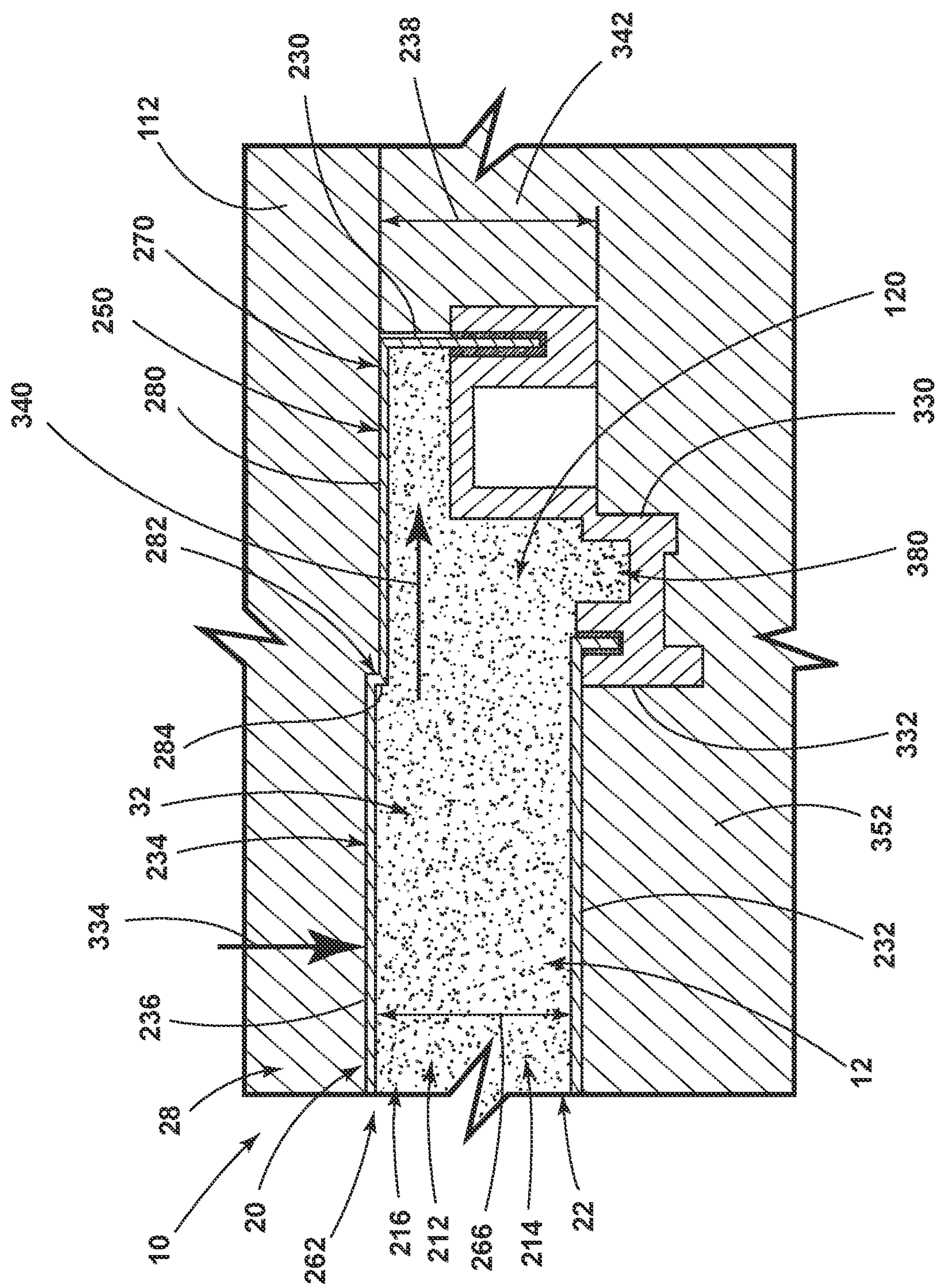
FIG. 20 is a schematic cross-sectional view of the insulating structure of FIG. 20 in the target position after operation of the insulation compaction device.
Figure 21:
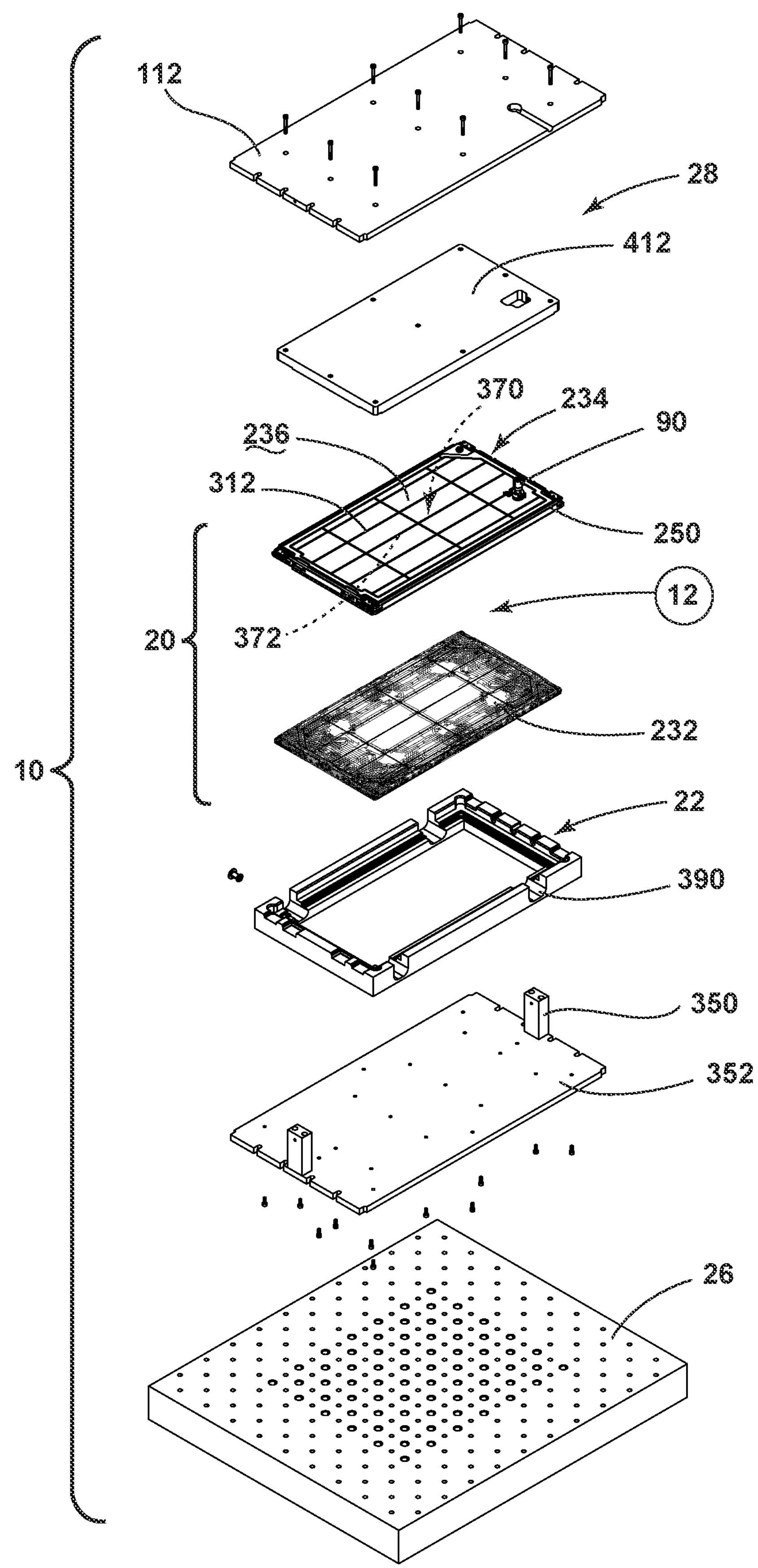
FIG. 21 is an exploded perspective view of the insulation compaction device of FIG. 12.

Referring again to FIGS. 2-9 and 11, a predetermined amount of the insulating media 12 can be disposed within the insulating internal cavity 14 (step 610). As discussed above, the use of a predetermined amount of insulating media 12 assists in the manufacture of the appliance cabinet 145 to achieve the desired insulation density 120 of the insulating media 12. Because the amount of insulating media 12 is known, a density of the insulating media 12 can be determined by adjusting the cavity volume 216 and cavity pressure 212 (shown in FIGS. 19 and 20) to place the insulating media 12 into a state that defines the desired insulation density 120. Once the predetermined amount of insulating media 12 is disposed within the insulating cavity, the operable piston 28 is disposed in engagement with the outer wrapper 140 (step 612). Once the operable piston 28 is disposed in engagement with the outer wrapper 140, at least one of the operable piston 28 and the gas pump are operated to define the selected insulating cavity environment that corresponds to the desired insulation density 120 of the insulating media 12 (step 614). As discussed above, the operable piston 28 can be operated to a predetermined location relative to the outer wrapper 140 to define the selected insulating cavity volume 216. The gas pump can also be operated to define a selected insulating cavity pressure 212, where the selected insulating cavity volume 216 and selected insulating cavity pressure 212 define the selected insulating cavity environment within which the insulating media 12 is maintained at the desired insulation density 120. As discussed above, the valve 40 can operate in a passive state 44 during operation of only the operable piston 28, or an active state 62 during operation of the gas pump either separately or in conjunction with the operable piston 28.

Referring again to FIGS. 2-9 and 11, during operation of the insulation compaction device 10, the current pressure 98 of the insulating internal cavity 14 is monitored to determine the current insulating cavity pressure 212 (step 616). The current volume 96 of the insulating internal cavity 14 is also monitored to determine when the current volume 96 is substantially equal to the selected chamber volume 32 (step 618). As these monitoring steps (steps 616 and 618) are being conducted, the current density of the insulating media 12 is determined by comparing the predetermined amount of the insulating media 12 to the current pressure 98 and current volume 96 (step 620). Once the current density is substantially equal to the desired insulation density 120 of the insulating media 12, the gas pump and the operable piston 28 are deactivated to maintain the desired insulation density 120 (step 622).

Referring now to FIGS. 1 and 12-25, which disclose an aspect of the insulation compaction device 10 for manufacturing an insulating structure 20, the insulation compaction device 10 can be used for forming portions of an appliance 18, such as a cabinet 145 or a door 210 for the appliance 18. In addition, the insulation compaction device 10 can be used to form components that are used within a cabinet 145 or a door 210 for the appliance 18. As discussed herein, the insulation compaction device 10 is used for installing an insulating media 12 within an insulating structure 20 and operating the insulation compaction device 10 for achieving a selected piston chamber environment 80 that includes a selected chamber volume 32 of the insulating structure 20. The selected piston chamber environment 80 also includes a cavity pressure 212 that operates to achieve a particular desired insulation density 120 of the insulating media 12.

According to the various aspects of the device, the insulation compaction device 10 is used for installing the insulating media 12 within the insulating structure 20 of an appliance 18. The insulating structure 20 includes an outer wrapper 140 and an inner liner 142 that are attached together to define the insulating cavity 214 between the inner liner 142 and the outer wrapper 140. The insulating media 12 is disposed within the insulating cavity 214. The operable piston 28 for the insulation compaction device 10 is used for engaging the insulating structure 20. The operable piston 28 operates to define a selected cavity volume 216 of the insulating cavity 214 and the desired insulation density 120 of the insulating media 12 within the insulating cavity 214.

A valve 40 is attached to the insulating structure 20 and defines selective communication between the insulating cavity 214 and the exterior 42 of the insulating structure 20. The valve 40 is operable between the passive state 44 and the active state 62. In the passive state 44, the valve 40 releases gas 46 disposed within the insulating cavity 214 to the exterior 42 via an evacuation pipe 442 during operation of the operable piston 28. The movement of the operable piston 28 forces the gas 46 out of the insulating cavity 214 via the valve 40 through the evacuation pipe 442. A pump mechanism 60 is in communication with the valve 40. Selective operation of the pump mechanism 60 places the valve 40 in an active state 62 to extract gas 46 from the insulating cavity 214 and define a cavity pressure 212 of the insulating cavity 214. The cavity pressure 212 is typically less than an equalized pressure 48 of the insulating cavity 214 with respect to the outer environment that is exterior 42 to the insulating structure 20.

The operable piston 28 and the pump mechanism 60 can be sequentially operable or simultaneously operable to define a selected piston chamber environment 80 that is defined by the selected cavity volume 216 and the cavity pressure 212. As discussed herein, operation of the operable piston 28 and the pump mechanism 60 can be operated in various sequences that include the sequential patterns 70 as well as simultaneous patterns 72 where one or both of the operable piston 28 and the pump mechanism 60 are operated at any one time.

As exemplified in FIGS. 12-22, the insulation compaction device 10 includes the piston chamber 22 that receives the insulating structure 20. When the insulating structure 20 is within the piston chamber 22, the piston chamber 22 maintains an outer perimeter 230 of the insulating structure 20 as a consistent size and shape during operation of the operable piston 28 to minimize deflection within the outer perimeter 230. The piston chamber 22 also maintains the position of the opposing wall 232 that is opposite a compression panel 234. In this manner, as the operable piston 28 presses down on a pressing surface 236 of the compression panel 234 for the insulating structure 20, the piston chamber 22 prevents an outward bow or other deflection of the outer perimeter 230 and the opposing wall 232 of the insulating structure 20. Accordingly, use of the operable piston 28 can be used for achieving a selected cavity volume 216. Stated another way, when the insulating cavity 214 is disposed within the piston chamber 22, only the compression panel 234 for the insulating structure 20 moves in a significant manner to modify the amount of space defined within the insulating cavity 214. Through this configuration, the use of the operable piston 28 can efficiently define the selected cavity volume 216 for the insulating structure 20. In addition, use of the piston chamber 22 maintains a depth 238 of the insulating structure 20 at the outer perimeter 230 to be consistent during operation of the operable piston 28.

As described herein, the operable piston 28 engages only a pressing surface 236 of the compression panel 234 for the insulating structure 20. The compression panel 234 includes an outer deflecting area 250 that is positioned near the outer perimeter 230 of the compression panel 234. In addition, the pressing surface 236 is located within the outer deflecting area 250. The operable piston 28 engages the pressing surface 236 and is also typically free of engagement or substantially free of engagement with the outer deflecting area 250. In this manner, use of the operable piston 28 is separated from the outer perimeter 230 and engages the insulating structure 20 in an area within the deflecting area 250 so that the depth 238 of the outer perimeter 230 can be maintained at a consistent depth 238 or thickness during operation of the insulation compaction device 10. As will be described more fully herein, the operable piston 28 may serve as a guide to direct the motion of the deflecting area 250 without directing a significant compressive force upon the deflecting area 250.

As exemplified in FIGS. 14-20, operation of the operable piston 28 moves the pressing surface 236 of the compression panel 234. In particular, the operable piston 28 moves the pressing surface 236 from an offset position 260 to a target position 262. The offset position 260 can be defined as a first distance 264 between the pressing surface 236 and an opposing wall 232 of the insulating structure 20. The target position 262 can be defined as a second distance 266 between the pressing surface 236 of the compression panel 234 and the opposing wall 232. As the pressing surface 236 moves between the offset position 260 and the target position 262, the deflecting area 250 that surrounds the pressing surface 236 moves from an angled orientation 268 with respect to the pressing surface 236 to a coplanar orientation 270 with respect to the pressing surface 236. In this manner, the deflecting area 250 operates to maintain an enclosed configuration of the insulating cavity 214 for the insulating structure 20 and also provides for movement of the pressing surface 236 of the compression panel 234 to define the selected cavity volume 216 of the insulating structure 20.

In the offset position 260, the deflecting area 250 defines a generally truncated pyramid shaped geometry or frustum-shaped geometry that extends between the outer perimeter 230 of the insulating structure 20 to the pressing surface 236 of the compression panel 234. When the operable piston 28 moves the pressing surface 236 to the coplanar or target position 262, the pressing surface 236 can be in alignment with each of the outer perimeter 230 of the insulating structure 20, as well as the deflecting area 250. While the term coplanar is used herein to describe an aspect of the target position 262, the alignment between the pressing surface 236, the deflecting area 250 and the outer perimeter 230 of the insulating structure 20 while in the target position 262 can be defined as generally coplanar, substantially coplanar, and other similar configurations where the pressing surface 236 and the deflecting area 250 are generally parallel with one another. In certain instances of the device, the pressing surface 236 and the deflecting area 250 can be coplanar in the target position 262.

Figure 18:
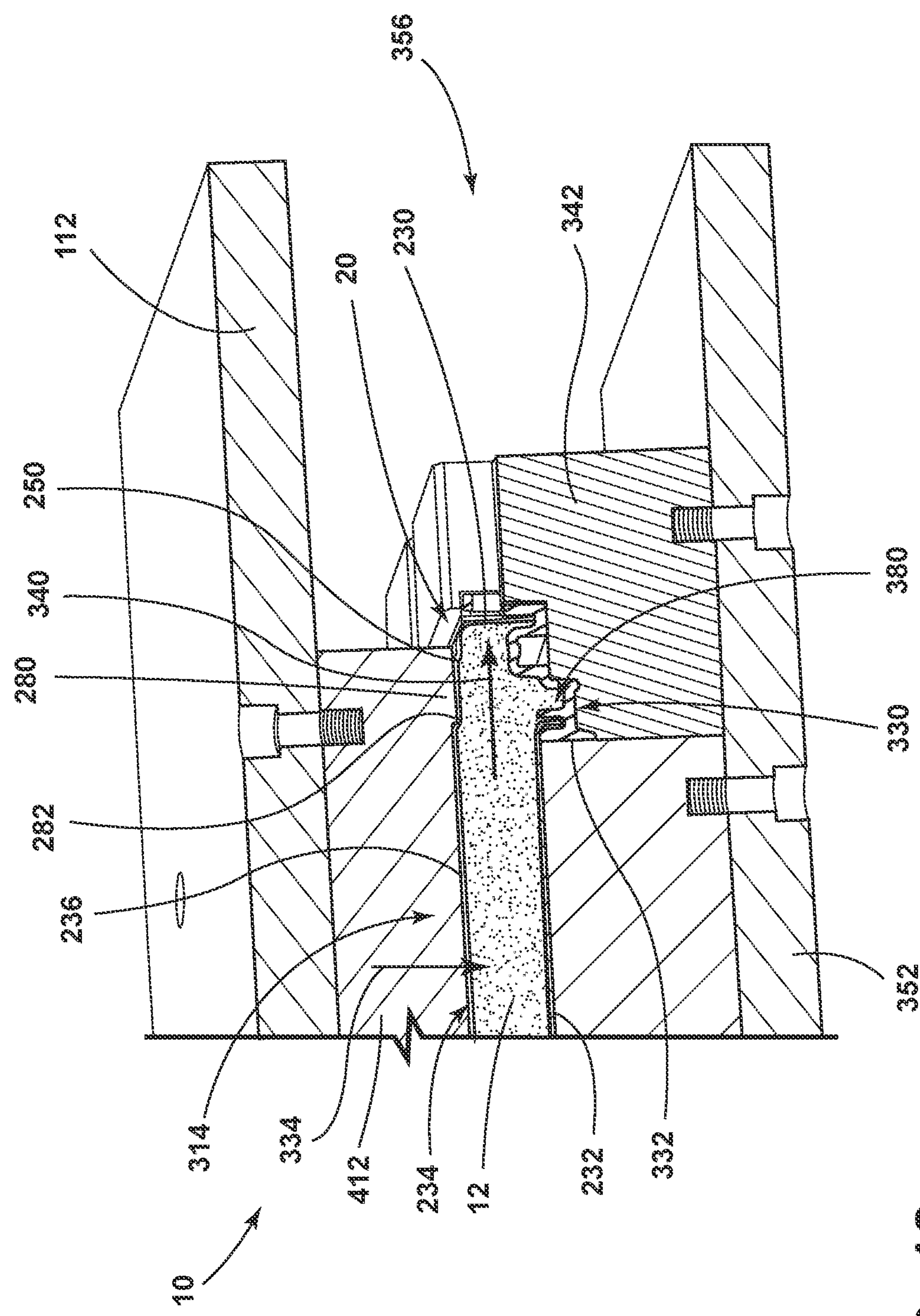
FIG. 18 is an enlarged cross-sectional view of the insulation compaction device of FIG. 17 and showing engagement of the operable piston with the compression surface of the insulating structure.

As exemplified in FIG. 18, the operable piston 28 can include a transition portion 280 that guides the deflection of the deflecting area 250 from the offset position 260 to the target position 262. Using the transition portion 280, in the target position 262, the pressing surface 236 and the deflecting area 250 may be generally parallel with one another, and slightly offset from one another. To guide the movement of the deflecting area 250, the compression panel 234 can include a transitional rim 282 that extends between the pressing surface 236 and the deflecting area 250. The transition portion 280 of the operable piston 28 includes a generally matching shape to that of the transitional rim 282. Through this configuration, the transition portion 280 engages with and at least partially retains the transitional rim 282 of the compression panel 234. This interaction guides the motion of the pressing surface 236 to be in line with the operable piston 28 and move in a vertical direction toward the opposing wall 232. The transitional rim 282 can operate in a manner similar to that of a living hinge to provide for a more efficient and consistent deflection of the deflecting area 250 as it moves between the offset position 260 and the target position 262. In addition, the outer edge 284 that is defined between the outer perimeter 230 and the deflecting area 250 can also operate in a manner similar to that of a living hinge. Accordingly, the deflecting area 250 and the outer edges 284 of the deflecting area 250 are designed to provide for an even and consistent operation between the offset position 260 and the target position 262.

In certain aspects of the device, the deflecting area 250 can include ridges, pleats or other deflecting sections 290 that can operate to accommodate the movement of the deflecting area 250 from the truncated pyramid or frustum shape of the offset position 260 to the parallel or coplanar positioning of the deflecting area 250 with respect to the pressing surface 236 when in the target position 262. These deflecting sections 290 also help to guide the deflection of the deflecting area 250 during the movement of the operable piston 28. The lack of engagement or minimal engagement between the deflecting area 250 and the operable piston 28 can be used to prevent any wrinkling, binding, catching or other undesirable type of deflection between the deflecting area 250 and the operable piston 28 as the deflecting area 250 moves from the offset position 260 to the target position 262.

Figure 14:
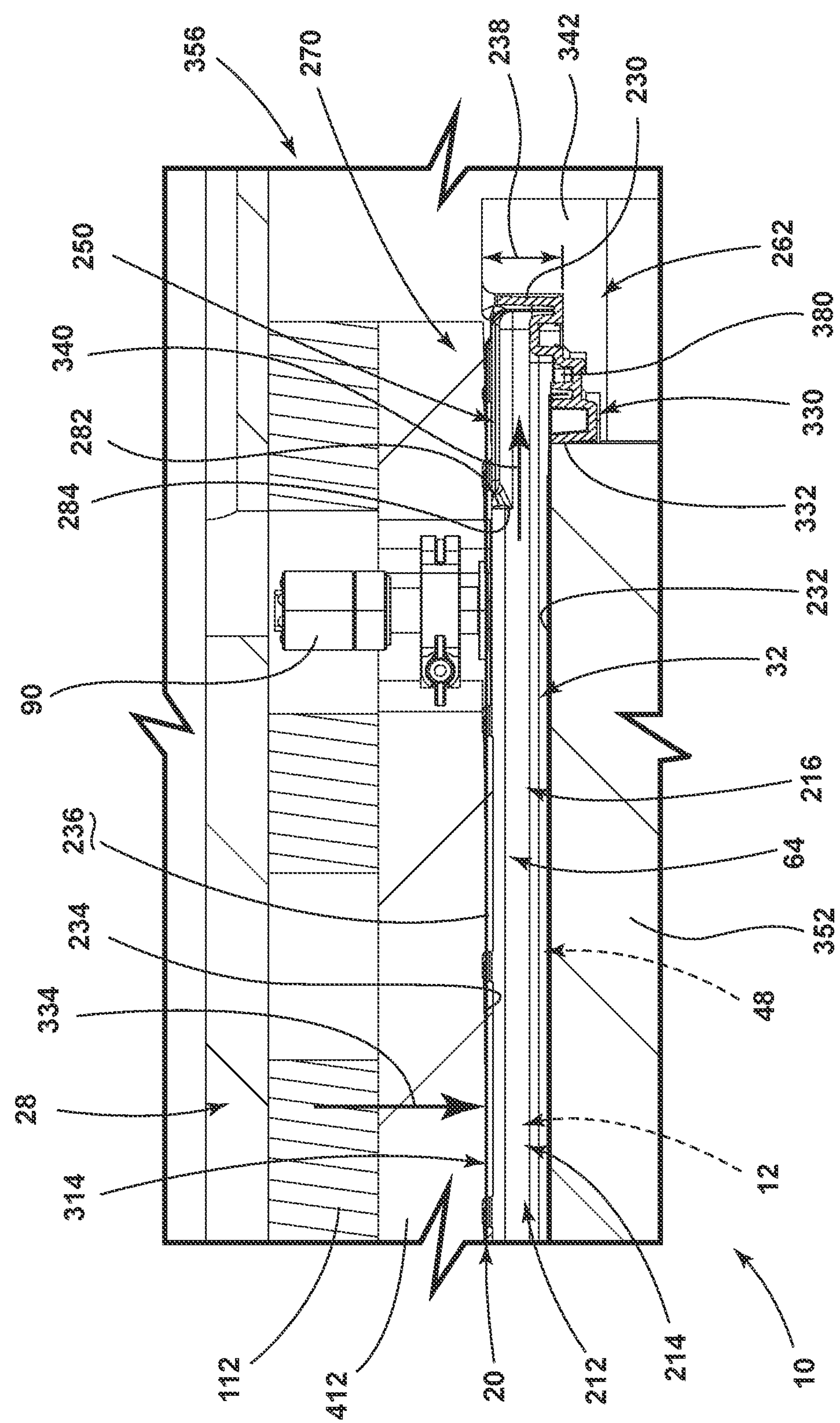
FIG. 14 is an enlarged cross-sectional view of the insulation compaction device of FIG. 13 and showing an aspect of the valve and pump mechanism for extracting air from the insulating cavity.
Figure 15:
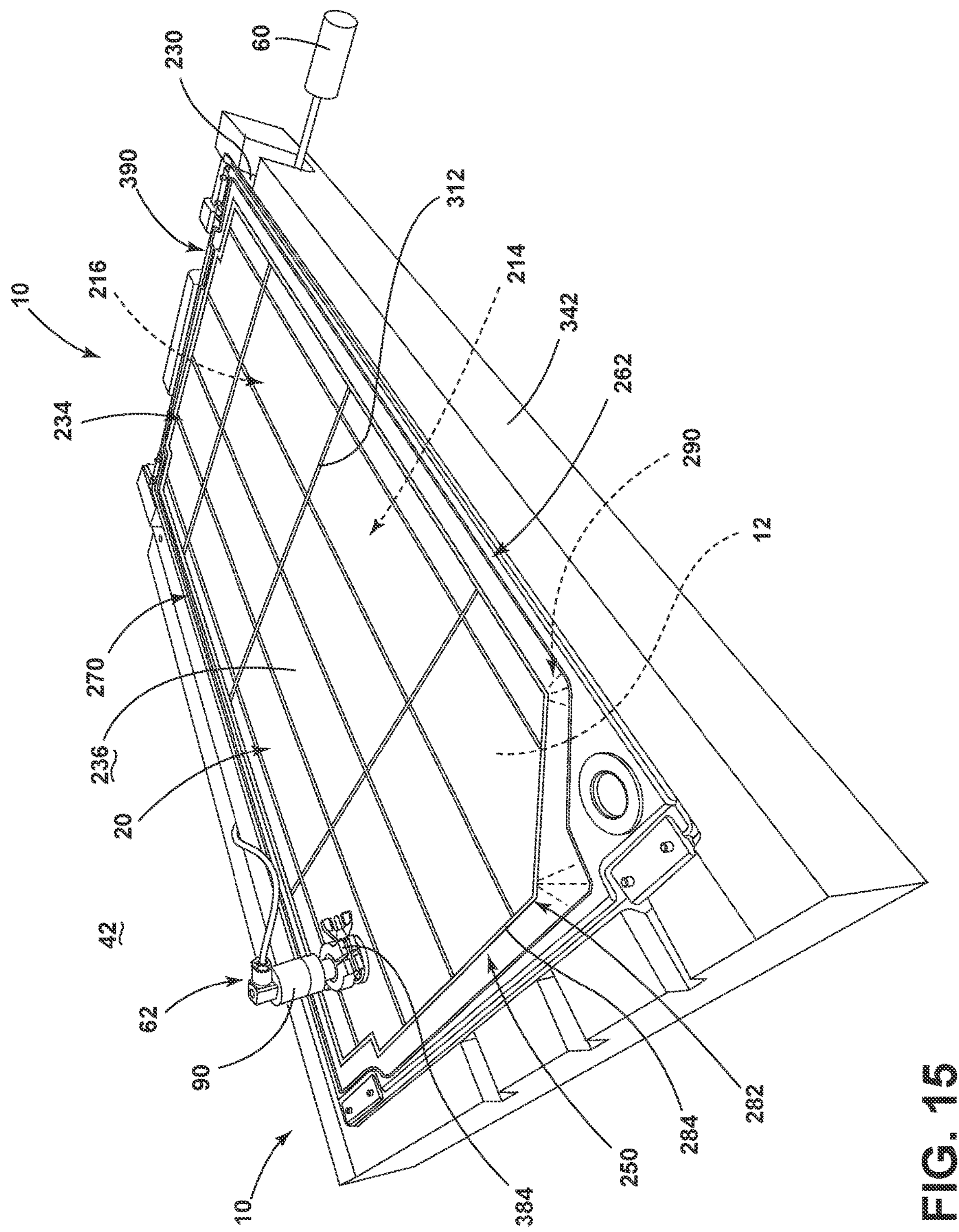
FIG. 15 is a top perspective view of an aspect of the insulation compaction device and showing the insulating structure disposed within the piston chamber.
Figure 16:
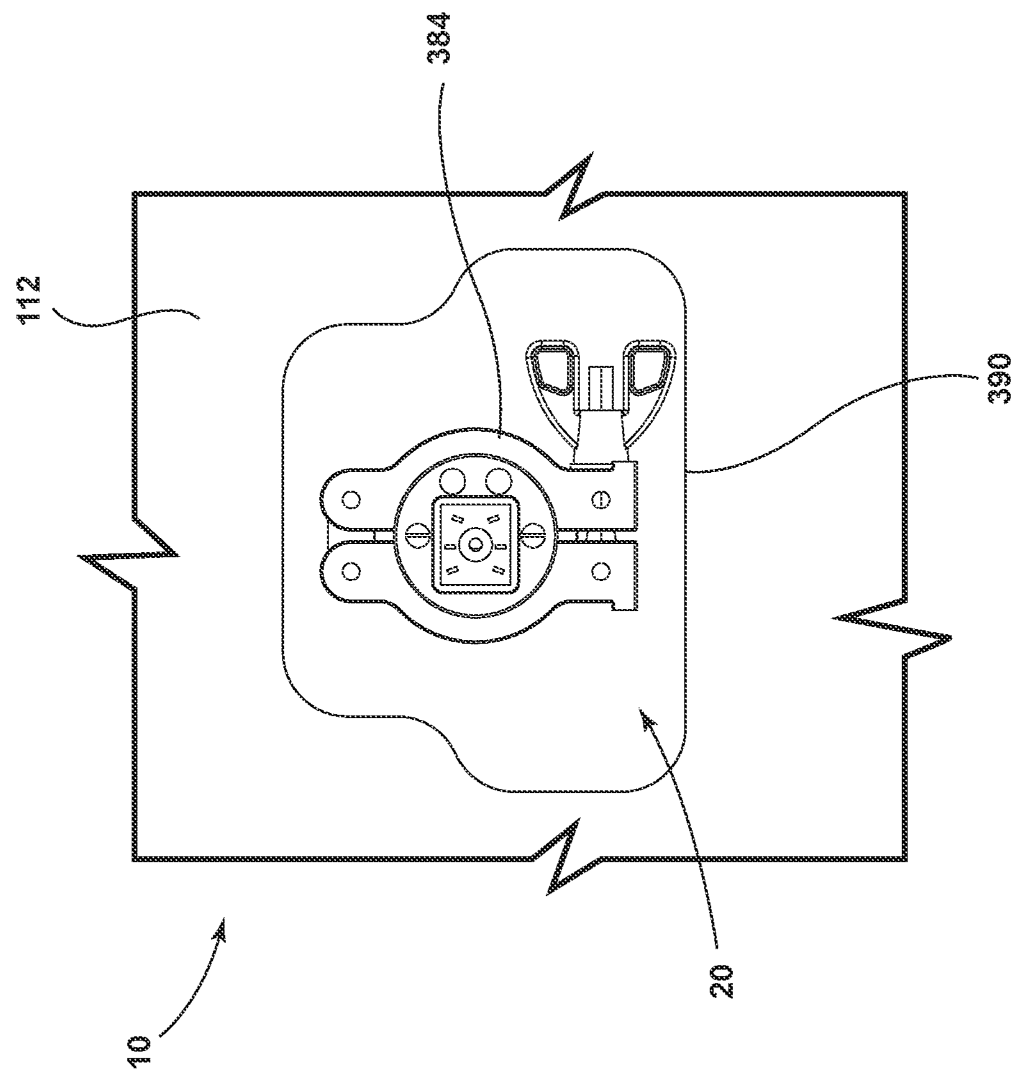
FIG. 16 is an enlarged plan view of the valve connector and an opening within the insulation compaction device for accommodating the valve connector.
Figure 22:
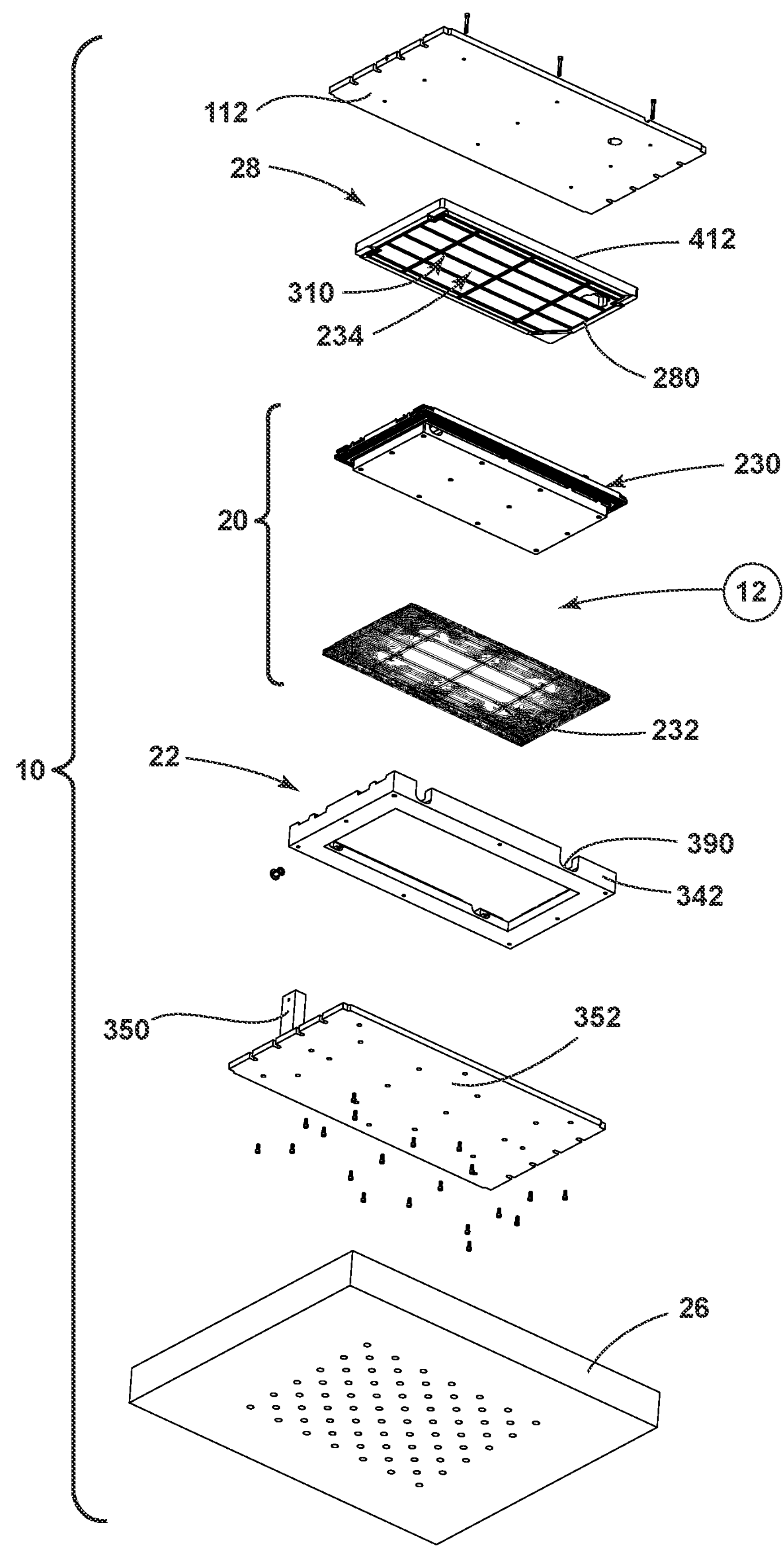
FIG. 22 is an exploded bottom perspective view of the insulation compaction device of FIG. 12.

Referring now to FIGS. 14 and 22, the operable piston 28 includes a surface contour 310 that matingly engages the pressing surface 236 of the insulating structure 20. In such an aspect of the device, the pressing surface 236 includes a plurality of reinforcing structures 312 that are defined within the material of the insulating structure 20. In order to provide a consistent pressing operation of the operable piston 28, the operable piston 28 includes a surface contour 310 that matches the various contours of the pressing surface 236, including the reinforcing structures 312. These reinforcing structures 312 also serve to maintain a lateral position 314 of the compression panel 234 during operation of the operable piston 28. These reinforcing structures 312 engage with the surface contours 310 of the operable piston 28 and maintain the pressing surface 236 in a laterally fixed position, and prevent twisting, sliding or other lateral displacement, with respect to the operable piston 28.

Accordingly, during operation of the operable piston 28 toward the target position 262, the pressing surface 236 is able to move only in a generally axial direction toward the opposing wall 232 of the insulating structure 20 to define the target position 262. This guiding feature of the operable piston 28 provides for a consistent movement of the pressing surface 236 as well as a consistent manipulation of the deflecting area 250 during movement of the operable piston 28. Accordingly, the mating engagement of the surface contours 310 of the operable piston 28 and the reinforcing structures 312 of the pressing surface 236 provide for a consistent and repeatable operation of the operable piston 28 during the manufacture of multiple insulating structures 20.

Referring again to FIGS. 12-22, the insulating structure 20, as discussed herein, includes an outer wrapper 140 and an inner liner 142. This outer wrapper 140 and inner liner 142 are attached together via a trim breaker 330. This trim breaker 330 can be a separate piece that is attached to each of the inner liner 142 and the outer wrapper 140. The trim breaker 330 can be a metallic piece, a plastic piece, or other similar component. In addition, the trim breaker 330 can include various additional sealing materials. Such sealing materials can include, but are not limited to, ceramic members, epoxy adhesives, welding material, and other similar sealing mechanisms that serve to decrease the permeability of the trim breaker 330 and to attach the trim breaker 330 to the inner liner 142 and the outer wrapper 140.

In addition, as discussed herein, the operable piston 28 engages the pressing surface 236 of the compression panel 234 for the insulating structure 20. Typically, the pressing surface 236 will be located at a position that is within the inner boundary 332 of the trim breaker 330 for the insulating structure 20. Through this configuration, movement of the operable piston 28 provides a downward force 334 that is transferred through the compression panel 234 and the insulating media 12 toward the opposing wall 232 of the insulating structure 20. The primary component of these downward compression forces exerted by the operable piston 28 are directed toward the opposing wall 232 of the insulating structure 20 an inside the inner boundary 332 of the trim breaker 330. Accordingly, the positioning of the trim breaker 330 is typically outside of the transitional rim 282 of the compression panel 234, which surrounds the pressing surface 236. This positioning helps to avoid a direct downward force 334 being exerted upon the trim breaker 330 for the insulating structure 20.

In certain aspects of the device, the trim breaker 330 can be made of a plastic material that may deflect in an undesirable formation during operation of the operable piston 28 if positioned to directly receive this downward force 334. By positioning the trim breaker 330 to an area outside of the transitional rim 282 of the pressing surface 236, compression of the insulating media 12 occurs downward in an area beneath the pressing surface 236. In turn, the compression in the downward direction is also translated in an outward direction 340 within an area outside the pressing surface 236. Accordingly, the downward force 334 is redirected within the insulating cavity 214 as the insulating media 12 spreads in the outward direction 340 during the movement of the operable piston 28. This spreading of the insulating media 12 in the outward direction 340 generates a compressive movement in the outward direction 340 that is directed to the outer perimeter 230 of the insulating structure 20 and a containment sidewall 342 of the piston chamber 22.

As discussed herein, the containment sidewall 342 of the piston chamber 22 prevents an outward deflection of the outer perimeter 230 of the insulating structure 20 during operation of the operable piston 28. Through this configuration, the compressive movement of the insulating media 12 occurs in the outward direction 340 and toward the containment sidewall 342 of the piston chamber 22, rather in the direction of the trim breaker 330 positioned within the piston chamber 22. Accordingly, within areas of the insulating cavity 214 that are outside the transitional rim 282, the compressive forces exerted by the operable piston 28 are directed in an orientation that is generally parallel with or oblique to the trim breaker 330 that extends between the outer wrapper 140 and the inner liner 142.

Referring now to FIGS. 12, 13 and 21-22, the insulation compaction device 10 can include one or more guide members, such as stop blocks 350, that operate to position the operable piston 28 in a lowermost position 356 when pressing down on the compression panel 234 for the insulating structure 20. These stop blocks 350 can extend between a base member 352 that supports the piston chamber 22 and a mechanical press 112 that operates the operable piston 28. When the operable piston 28 reaches a lowermost position 356, the mechanical press 112 engages the stop blocks 350 that are attached to the base member 352 for the piston chamber 22. This engagement prevents further downward movement of the mechanical press 112. This stopping function of the mechanical press 112 can be actuated through various sensors and positioning mechanisms that deactivate or stop the movement of the mechanical press 112 when the mechanical press 112 engages the stop blocks 350. In turn, the engagement of the mechanical press 112 with the stop blocks 350 also stops the movement of the operable piston 28 when reaching the lowermost position 356.

As discussed herein, the lowermost position 356 can be referred to as the target position 262 of the pressing surface 236 for the compression panel 234. It is contemplated that the mechanical press 112 can be maintained in this target position 262 for a certain amount of time to achieve the desired compression and compaction of the insulating media 12 within the insulating structure 20, with a minimal amount of rebound of the insulating media 12. Once the pressing operation is complete, the mechanical press 112 can be released and moved in an upward direction away from the insulating structure 20 and also remove the operable piston 28 from the pressing surface 236 of the compression panel 234.

The compression of the insulating media 12 that is included within the insulating structure 20 can include any one of various materials that can include, but are not limited to, silica, fumed silica, rice husk, glass spheres of varying size, and other similar primary insulating components. It is also contemplated that the insulating media 12 can include various getters, dessicants, opacifiers, carbon black, and other similar insulating compositions. The insulating media 12 can also include various insulating gasses. Such gasses can include, but are not limited to neon, carbon dioxide, xenon, krypton, combinations thereof and other similar insulating gasses.

According to various aspects of the device, the insulation compaction device 10 can be utilized for pressing a door 210 for an appliance 18. This door 210 can include various features that are located on and operate within a cabinet 145 for the appliance 18. These features can include, but are not limited to, hinge receptacles, handle receptacles, cutouts for water and ice dispending, interior shelves, inner and outer curvatures, and other similar features that are typically found within appliance panels.

Referring again to FIGS. 12-27, the operable piston 28 can include the surface contour 310 that substantially matches the reinforcing structures 312 of the pressing surface 236 for the compression panel 234. It is also contemplated that the operable piston 28 can include a generally curved surface or camber 370. This camber 370 can be a surface of the operable piston 28 that deflects over the course of the operation of the operable piston 28. By way of example, and not limitation, the camber 370 of the operable piston 28 can include a central portion 372 that engages the pressing surface 236 during an initial engagement between the operable piston 28 and the pressing surface 236. As the operable piston 28 moves downward, additional portions of the camber 370 of the operable piston 28 engage the pressing surface 236 to apply the downward force 334 in an outward or radiating fashion. As the operable piston 28 further engages additional portions of the pressing surface 236, the camber 370 of the operable piston 28 begins to flatten as the amount of downward force 334 increases. At the conclusion of the pressing operation, the operable piston 28 in the target position 262 can include a generally flat surface that includes the surface contours 310 of the pressing surface 236, but typically without the camber 370. This camber 370 can be utilized for pressing the insulating media 12 in a generally outward direction 340 or radiating direction within the insulating cavity 214 of the insulating structure 20. This can be used to avoid the application of a direct compressive force against the trim breaker 330 and also to provide a generally equalized density throughout the entire insulating cavity 214.

During operation of the operable piston 28, gas 46 is expressed, either actively or passively, through a vacuum outlet or other valve 40 that is coupled with the insulating structure 20 and provides communication between the insulating cavity 214 and exterior 42 of the insulating structure 20. To direct the gas 46 toward this valve 40, various gas flow conduits 380 can be installed or defined within the insulating cavity 214 to direct the efficient movement of gas 46 toward the valve 40. These gas flow conduits 380 can include filter paper that is positioned within portions of the insulating cavity 214, typically toward the outer perimeter 230 of the insulating structure 20. In certain aspects of the device, the trim breaker 330 can include various undulations that define one or more gas flow conduits 380. The filter paper can be positioned adjacent to these gas flow conduits 380 to allow for the movement of gas 46 into and within a particular gas flow conduit 380. At the same time, the filter paper prevents significant amounts of insulating media 12 from infiltrating into the gas flow conduit 380. Various perforated tubes can also be installed within the insulating cavity 214 and within the gas flow conduits 380 to further direct the efficient movement of gas 46 toward the valve 40. In certain aspects of the device, this filter paper is positioned near the gas flow conduit 380 of the trim breaker 330 and the various structures that define the trim breaker 330. Accordingly, this filter paper can also prevent the insulating media 12 for infiltrating into certain portions of the trim breaker 330 that may cause unwanted deflection of the trim breaker 330 during operation of the operable piston 28. The gas flow conduits 380 can be attached to the valve 40 and also to a vacuum maintenance port 382. This vacuum maintenance port 382 can be used to maintain the partial vacuum within the insulating structure 20 after manufacture of the appliance 18, such as during a maintenance or repair of the appliance 18. It is contemplated that the valve 40 and the vacuum maintenance port 382 can be separate components or can be incorporated within a common assembly. The valve 40 can also include features that allow the valve 40 to act as the vacuum maintenance port 382.

As exemplified in FIGS. 12-22, the piston chamber 22 and the operable piston 28 can include various recesses 390 that are defined within the structure of these components. These recesses 390 can be used for accommodating space for particular structures, such as the valve 40, a clamp 384 or other closure device for the valve 40, the pump mechanism 60, and other similar devices. In addition, these recesses 390 can be used for accessing the interior of the piston chamber 22 for separating an insulating structure 20 from the piston chamber 22. Accordingly, various recesses 390 can be positioned about various portions of the containment sidewall 342 for the piston chamber 22 to provide manual access with hands, or access using one or more tools for lifting the insulating structure 20 from the piston chamber 22.

Referring again to FIGS. 12, 13, 18 and 21-22, the containment sidewall 342 and other structures that form the piston chamber 22 can be anchored to the base member 352 via various fasteners. The one or more guide mechanisms or stop blocks 350 that are attached to the base member 352 can be positioned adjacent to or around the piston chamber 22 to provide for the lowermost position 356, or the target position 262, of the operable piston 28. The operable piston 28 can be attached to the mechanical press 112 or other pressing mechanism through various fasteners that extend through the mechanical press 112. One or more support layers 412 can also be attached to the mechanical press 112, for maintaining the position of the surface contour 310 for the operable piston 28 as well as the camber 370, where utilized.

Typically, those portions of the operable piston 28 and the piston chamber 22 that engage the inner liner 142 and the outer wrapper 140 are generally planar in configuration. Those portions of the piston chamber 22 that engage the trim breaker 330 can include various undulations that match the various contours and shapes of the trim breaker 330 that extends between the inner liner 142 and the outer wrapper 140. This matching of contours of the various components of the insulating structure 20 assists in achieving a consistent and repeatable pressing operation to arrive at the selected piston chamber environment 80.

Figure 17:
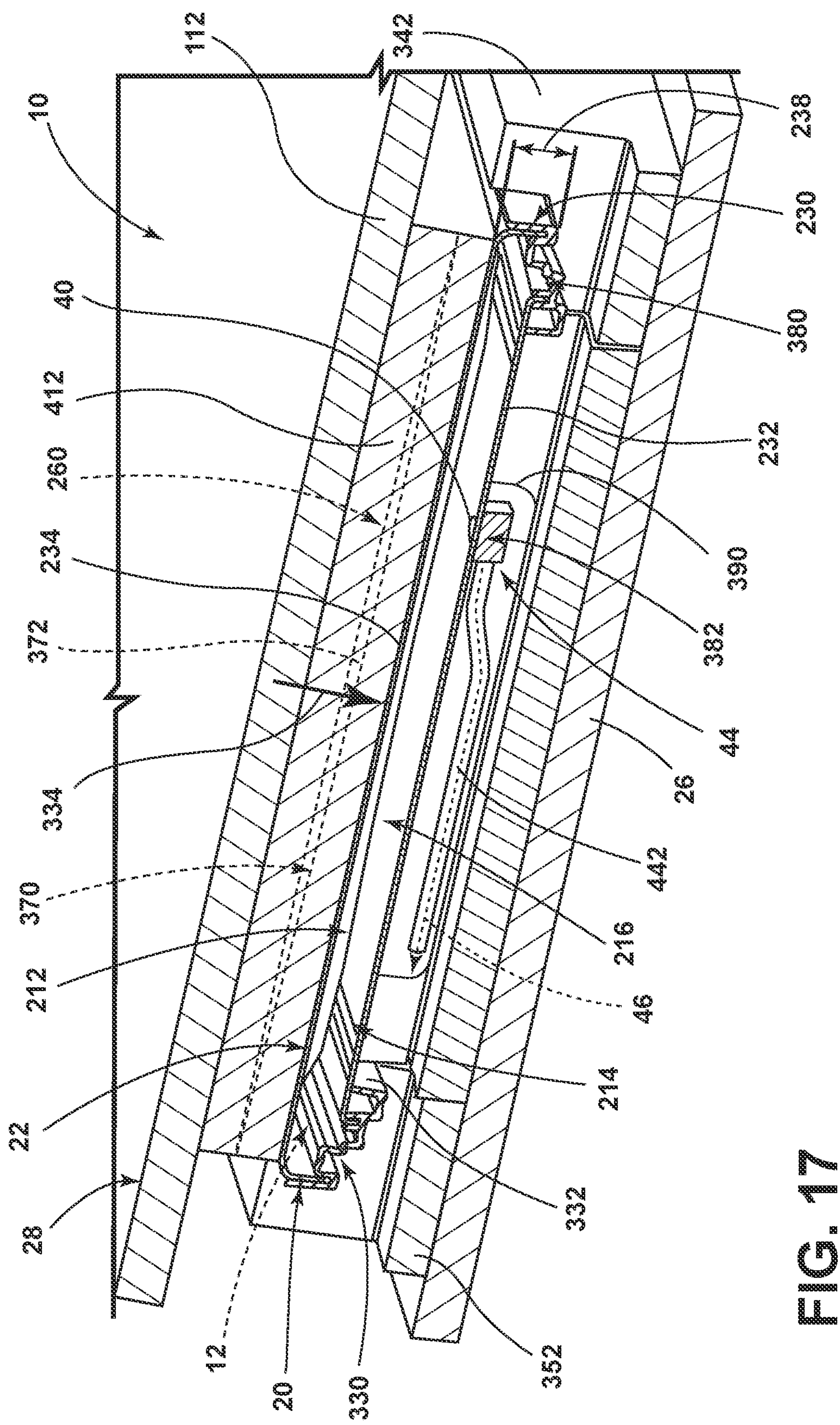
FIG. 17 is a cross-sectional view of the insulation compaction device showing an aspect of the maintenance valve for use after manufacture of the appliance.

As exemplified in FIGS. 14, 17 and 18, the trim breaker 330 is positioned in a generally downward facing direction toward a base member 352 for the piston chamber 22. The outer wrapper 140 is positioned to face the operable piston 28 and also extends downward to define the outer perimeter 230 of the insulating structure 20. As discussed herein, this configuration of the outer wrapper 140 serves to receive the downward force 334 from the operable piston 28 and also translate this downward force 334 into a radial force that is exerted in an outward direction 340 that presses the insulating media 12 outward toward the outer perimeter 230 of the insulating structure 20.

Figure 23:
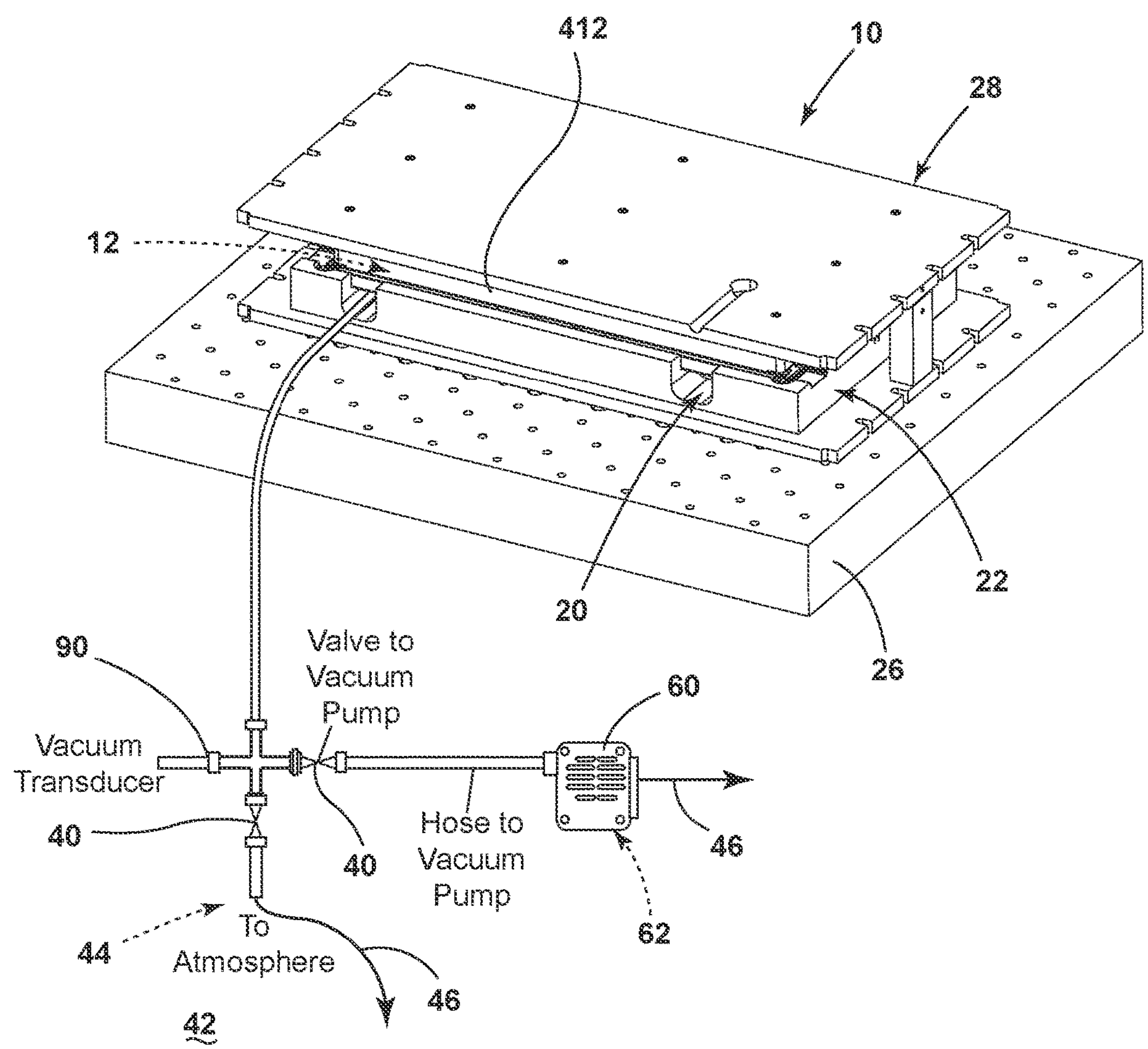
FIG. 23 is a schematic perspective view of an aspect of the insulation compaction device and showing components of the valve and pump mechanism for extracting gas from the insulating cavity during operation of the insulation compaction device.

Referring now to FIG. 23, the pump mechanism 60 that operates in conjunction with the operable piston 28 can be used contemporaneously with the operable piston 28 or can be used at times when the operable piston 28 is deactivated or unmoving. According to various aspects of the device, the valve 40 can be placed in the passive state 44 during movement of the operable piston 28 toward the target position 262. In this passive state 44, gas 46 moves according to the compression of the pressing surface 236 and the compression panel 234 to move gas 46 out from the insulating cavity 214, toward the gas flow conduit 380, and through the valve 40. At the conclusion of the movement of the operable piston 28, or the conclusion of a stage of movement for the operable piston 28, the pump mechanism 60 can be activated to extract gas 46 from spaces between the particles of insulating media 12 positioned within the insulating cavity 214.

It is contemplated that the operation of the operable piston 28 toward the target position 262 defines the selected insulation density 120 of the insulating media 12 within the insulating cavity 214. Operation of the pump mechanism 60 after the operable piston 28 stops moving will typically not significantly change the density of the insulating media 12. Rather, the pump mechanism 60 will extract gas 46 from interstitial spaces defined between the various particles of the insulating media 12. The relative positions of the individual particles will typically remain substantially unchanged during operation of the pump mechanism 60. In this manner, a particular amount of insulating media 12 is placed within the insulating cavity 214 prior to closure of the insulating structure 20. Accordingly, a particular amount of insulating media 12 is placed within the insulating cavity 214 to achieve a selected insulation density 120 as well as the selected piston chamber environment 80.

It is also contemplated that the operable piston 28 can work in combination with the pump mechanism 60. In such an aspect of the device, the operable piston 28 manipulates the pressing surface 236 and the compression panel 234 toward the target position 262 of the insulating structure 20. Contemporaneously, the pump mechanism 60 can activate to proactively extract gas 46 from the insulating cavity 214 to minimize the amount of resistance that may be experienced by the operable piston 28 as it moves the pressing surface 236 of the compression panel 234 toward the target position 262. In this manner, the pump mechanism 60 can operate to maintain the insulating cavity 214 at a cavity pressure 212 that is less than the ambient air pressure. This extraction of gas 46 during operation of the operable piston 28 can be followed by a final extraction that generates an at least partial vacuum within the insulating cavity 214.

As discussed herein, where the operable piston 28 and the pump mechanism 60 operate in a contemporaneous fashion, these two components can be operated at the same time, in a sequential pattern 70 or in a simultaneous pattern 72, and combinations thereof. In the sequential pattern 70, the operable piston 28 moves a particular distance while the valve 40 is in the passive state 44. Then the pump mechanism 60 activates to define the active state 62 of the valve 40 to extract a certain amount of gas 46 from the insulating cavity 214. In the simultaneous pattern 72, the operable piston 28 moves downward and, at the same time, the pump mechanism 60 operates to define the active state 62 of the valve 40. These sequential and contemporaneous operating steps can be performed in various sequences and patterns for maximizing the compression of the insulating media 12 toward the selected insulation density 120 and also to achieve the selected piston chamber environment 80 for the insulating structure 20.

Figure 24:
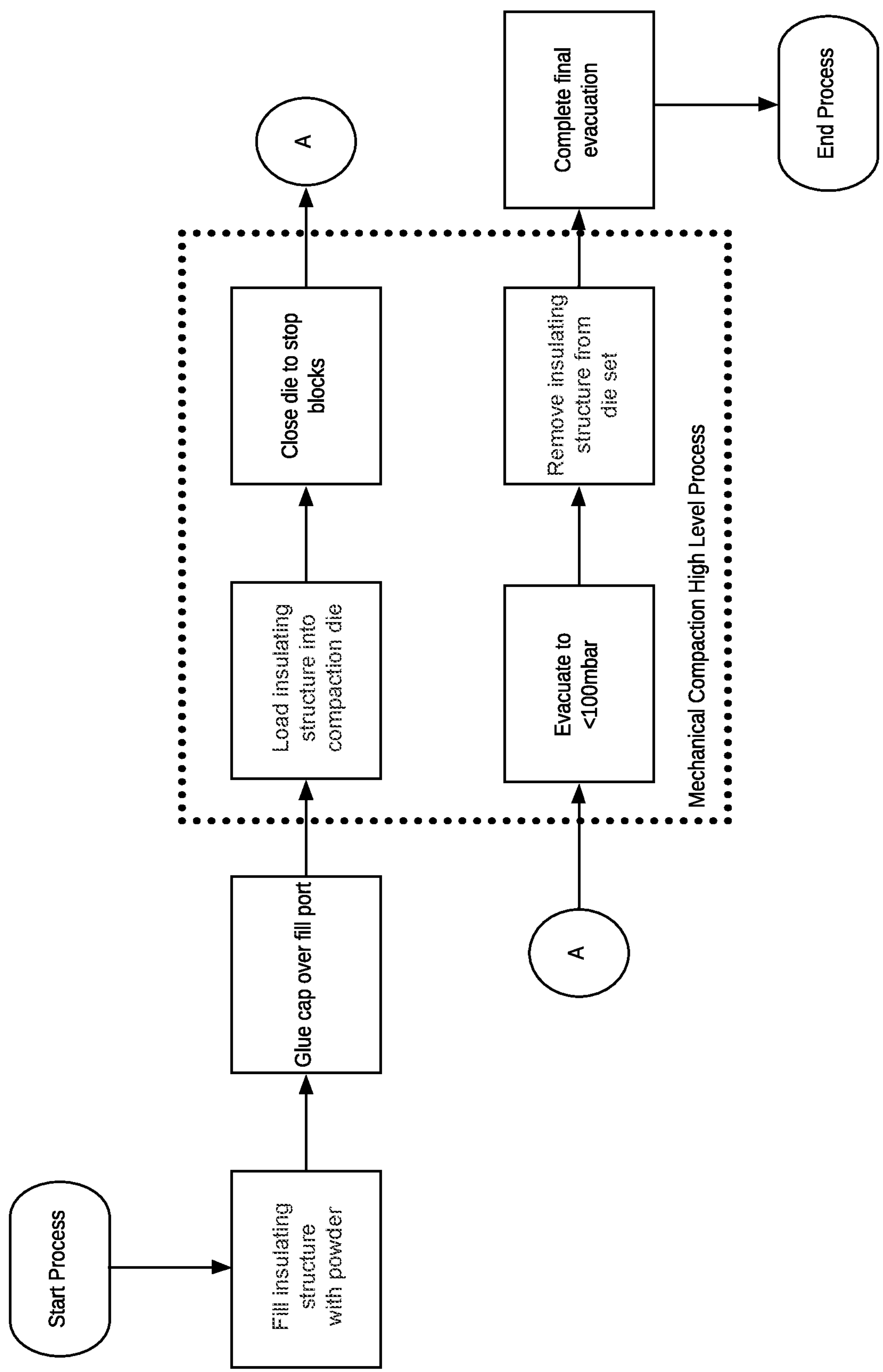
FIG. 24 is an exemplary linear flow diagram illustrating a process for forming an insulating structure utilizing an insulation compaction device.
Figure 25:
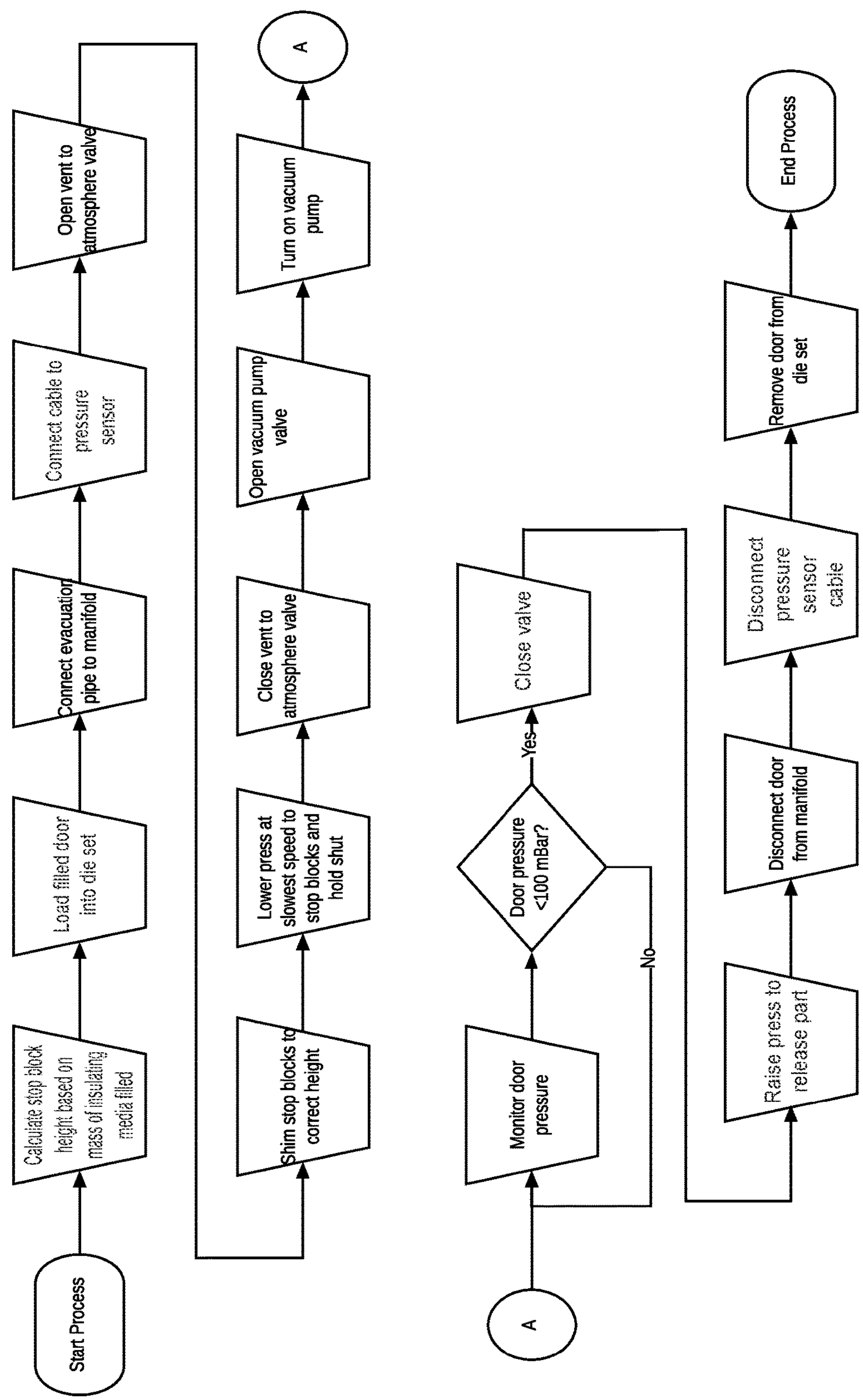
FIG. 25 is an exemplary linear flow diagram illustrating a process for forming an insulating structure in the form of an appliance door utilizing the insulation compaction device.
Figure 26:
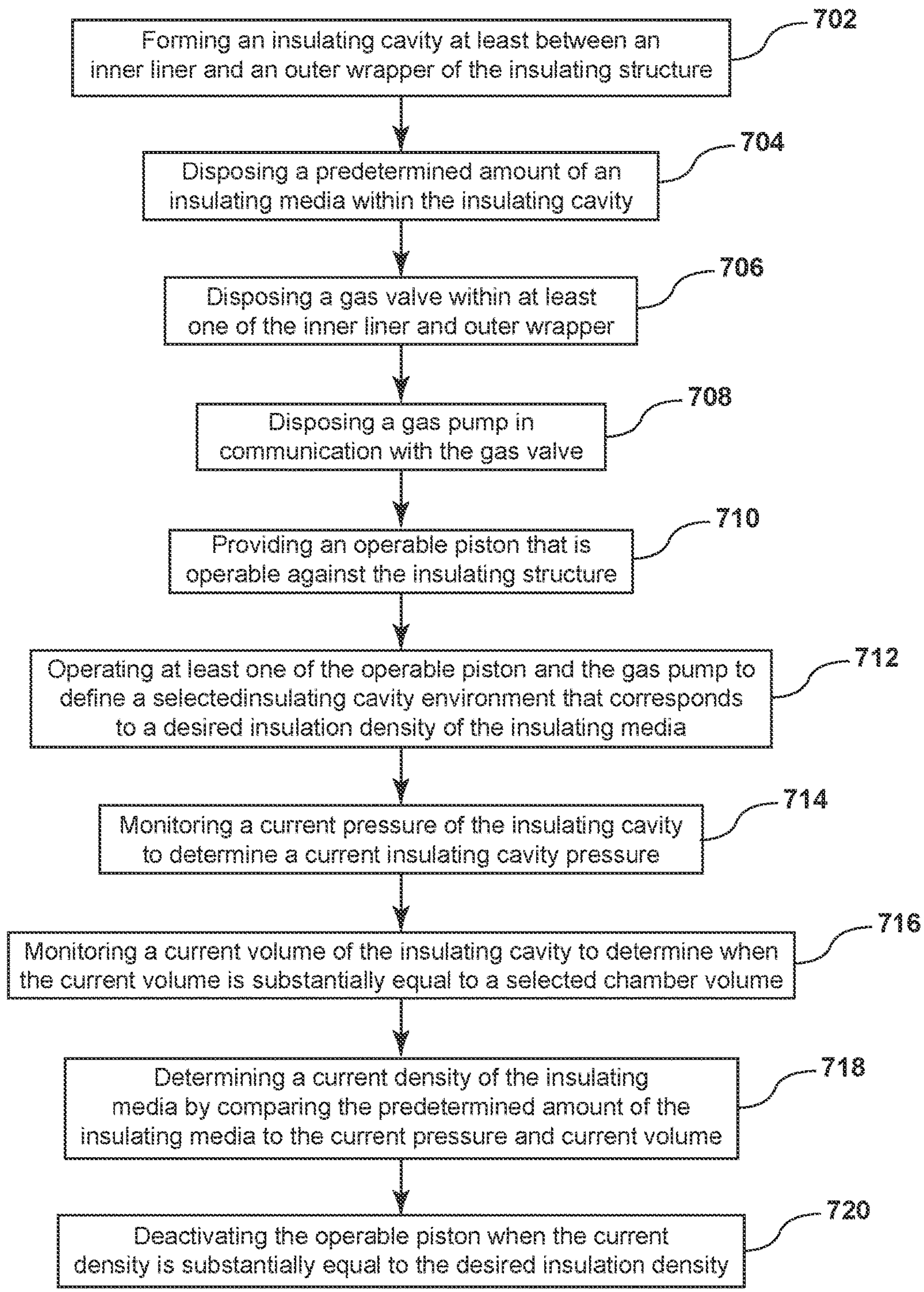
FIG. 26 is a linear flow diagram illustrating a method for forming an insulating structure for an appliance using an aspect of the insulation compaction device.
Figure 27:
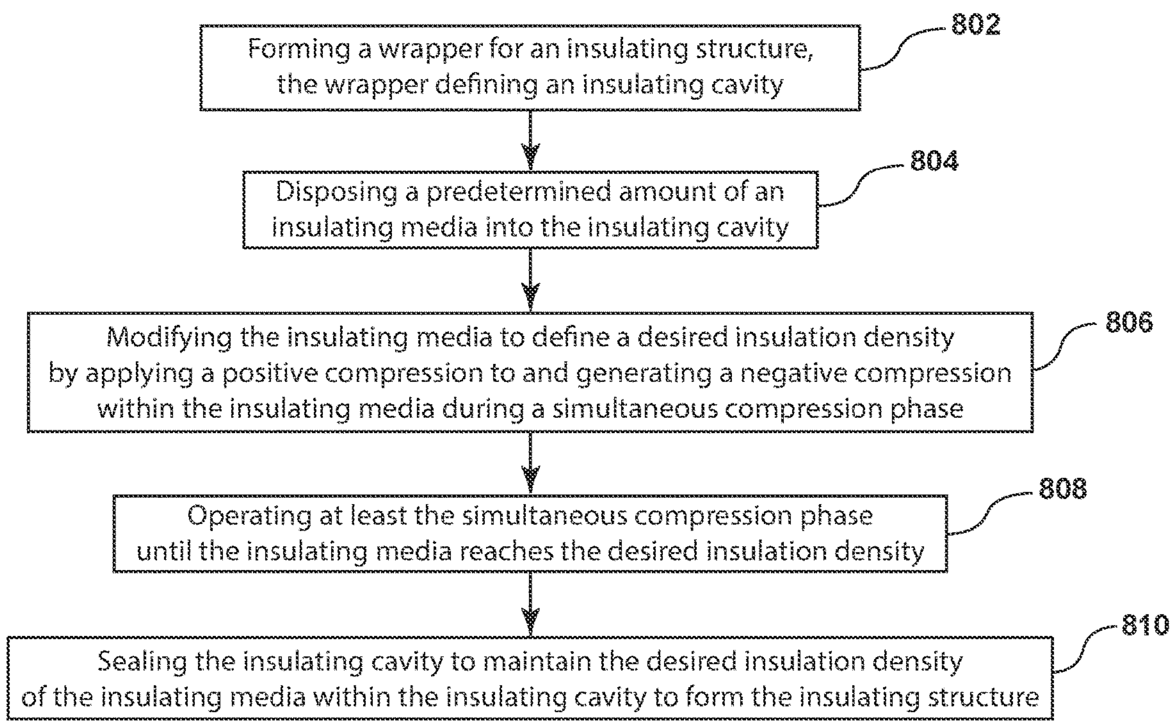
FIG. 27 is a linear flow diagram illustrating a method for forming an insulating structure for an appliance using an aspect of the insulation compaction device.

Referring now to FIGS. 23-25, the valve 40 and pump mechanism 60 can include a pressure sensor 90 that monitors the cavity pressure 212 of the gas 46 within the insulating structure 20. This pressure sensor 90, such as a vacuum transducer, can be coupled with the valve 40 that extends to the pump mechanism 60, such as a vacuum pump. The pressure sensor 90 can also be coupled with the valve 40 during operation of the passive state 44 for allowing the passive release of gas 46 during operation of the operable piston 28.

During the performance of the insulation compaction device 10, the insulating structure 20 is filled with the insulating media 12, and the insulating structure 20 is sealed. This can include fitting a cap over a fill port that is used for placing the insulating media 12 within the insulating cavity 214. The insulating structure 20 can be placed within a compaction die, such as the piston chamber 22. The operable piston 28 is then moved in a downward direction to engage the pressing surface 236 of the compression panel 234 and moved to the target position 262 that is defined by the stop blocks 350 that are attached to the base member 352 for the piston chamber 22. The pump mechanism 60 is then activated to extract gas 46 to define a partial vacuum within the insulating cavity 214. The desired chamber pressure 64 within the insulating cavity 214 is in the order of approximately 100 mBar or less than approximately 100 mBar. It should be understood that other chamber pressures above 100 mBar are also contemplated. After this extraction is complete, the insulating structure 20 is then removed from the piston chamber 22 and a final evacuation is performed.

As exemplified in FIG. 25, the process for forming a vacuum insulating structure 20 can include calculating a desired height 440 of the stop blocks 350 based upon a mass of powder to be filled within the insulating structure 20. The insulating media 12 is be placed within the insulating structure 20 and the insulating structure 20 is subsequently sealed. The sealed insulating structure 20 is then placed within the die or the piston chamber 22. An evacuation pipe 442 is attached to the valve 40 or other manifold for extracting gas 46 from the insulating cavity 214. A cable is then attached to a pressure transducer or other pressure sensor 90 for monitoring the cavity pressure 212 within the insulating cavity 214. The valve 40 is opened to the atmosphere to define the passive state 44 of the valve 40.

After the height 440 of the stop block 350 has been calculated, the stop blocks 350 are then moved to a particular height 440 relative to the piston chamber 22 to achieve the proper target position 262 of the operable piston 28 and the insulating structure 20. The operable piston 28 is then moved to engage the stop blocks 350 and, in turn, move the pressing surface 236 and the compression panel 234 to the target position 262. Once in the target position 262, the valve 40 to the atmosphere is closed and the valve 40 to the pump mechanism 60 is open to define the active state 62 of the valve 40. The pump mechanism 60 is then activated and the pressure sensor 90 monitors the cavity pressure 212 of the insulating structure 20. When the cavity pressure 212 achieves the desired chamber pressure 64, as discussed herein, the valve 40 is closed. The operable piston 28 is raised and the valve 40 and/or the pump mechanism 60 are separated or detached from the insulating structure 20. The pressure sensor 90 is also removed from the insulating structure 20 and the insulating structure 20 is removed from the piston chamber 22.

Referring now to FIGS. 12-23 and 26, having described various aspects of the insulation compaction device 10, a method 700 for forming insulating structure 20 for an appliance 18 is disclosed, where this method 700 utilizes an aspect of the insulation compaction device 10. According to the method 700, step 702 includes forming an insulating cavity 214 at least between an inner liner 142 and an outer wrapper 140 of the insulating structure 20. Once formed, a predetermined amount of insulating media 12 is disposed within the insulating cavity 214 (step 704). A gas valve 40 is disposed within at least one of the inner liner 142 and the outer wrapper 140 (step 706). As discussed herein, the gas valve 40 defines a selected communication between the insulating cavity 214 and an exterior 42 of the insulating structure 20. In addition, this valve 40 is operable between a passive state 44 and an active state 62. A gas pump mechanism 60 is also disposed in communication with a gas valve 40 (step 708). The gas pump mechanism 60 is in communication with the insulating cavity 214 via the gas valve 40. An operable piston 28 is provided that is operable against the insulating structure 20 (step 710). As described herein, the operable piston 28 engages a pressing surface 236 of the compression panel 234 for the insulating structure 20. At least one of the operable piston 28 and the gas pump mechanism 60 is operated to define a selected insulating cavity environment that corresponds to an insulation density 120 of the insulating media 12 (step 712). The operable piston 28 operates to a predetermined location relative to the insulating structure 20 to define a selected insulating cavity volume 216. This position typically corresponds to a target position 262 of the compression panel 234 for the insulating structure 20. The gas pump mechanism 60 is also operated to define a selected insulating cavity pressure 212. The selected insulating cavity volume 216 and the selected insulating cavity pressure 212 define the selected insulating cavity environment within which the insulating media 12 is maintained within the desired insulation density 120.

Referring again to FIGS. 12-23 and 26, according to the method 700, a current pressure 98 of the insulating cavity 214 is monitored to determine a current insulating cavity pressure 212 (step 714). A current volume 96 of the insulating cavity 214 is also monitored to determine whether a current volume 96 of the insulating cavity 214 is substantially equal to a selected chamber volume 32 of the insulating cavity 214 (step 716). A current density of the insulating media 12 is determined by comparing a predetermined amount of the insulating media 12 to the current pressure 98 and current volume 96 of the insulating structure 20 (step 718). The operable piston 28 is then deactivated when the current density is substantially equal to the insulating density (step 720). As described herein, it is contemplated that according to various aspects of the device, the operable piston 28 and the pump mechanism 60 can be operated sequentially or contemporaneously to achieve the desired insulation density 120.

Referring now to FIGS. 12-23 and 27, having described various aspects of the insulation compaction device 10, a method 800 is disclosed for forming an insulative member that utilizes an aspect of the insulation compaction device 10, as described herein. According to the method 800, a step 802 includes forming an outer wrapper 140 for an insulating structure 20 where the outer wrapper 140 defines an insulating cavity 214. A predetermined amount of an insulating media 12 is disposed into the insulating cavity 214 (step 804). It is contemplated that the insulating media 12 includes a pre-compaction density 160. The insulating media 12 is then modified to define a desired insulation density 120 by applying a positive compression to and generating a negative compression within the insulating media 12 during the simultaneous compression phase (step 806). This can correspond to the contemporaneous operation of the operable piston 28 and the pump mechanism 60. This can also correspond to a pattern of operation that includes alternating operations as well as contemporaneous operations of the operable piston 28 and the pump mechanism 60 to achieve the desired insulation density 120 of the insulating media 12. The simultaneous compression phase is operated until the insulating media 12 reaches the desired insulation density 120 (step 808). The desired insulation density 120 is greater than the pre-compaction density 160. The insulating cavity 214 is then sealed to maintain the desired insulation density 120 of the insulating media 12 within the insulating cavity 214 to form the insulating structure 20 (step 810).

According to the various aspects of the device, the insulation compaction device 10 having the piston chamber 22 and the operable piston 28 as well as the pump mechanism 60 operates according to various patterns and sequences to achieve the selected piston chamber environment 80 for the insulating structure 20. As discussed herein, the selected piston chamber environment 80 can be defined by the selected cavity volume 216, the cavity pressure 212 and the selected insulation density 120 of the insulating media 12. Using the operable piston 28 and the pump mechanism 60, the selected piston chamber environment 80 can be achieved in an efficient manner and in an expedient period of time. The insulation compaction device 10, as described herein, can be utilized to minimize wasted resources, typically in the form of the insulating media 12 and wasted energy and time through other processes that may take far longer to achieve the desired insulation density 120 and cavity environment that can be achieved through the use of the insulation compaction device 10 described herein.

According to another aspect of the present disclosure, an insulation compaction device for installing insulation within an insulating structure of an appliance incudes an outer wrapper and an inner liner that are attached together to define the insulating structure having an insulating cavity defined therein. An insulating media is disposed within the insulating cavity. An operable piston selectively engages the insulating structure. The operable piston operates to define a selected cavity volume of the insulating cavity and a selected insulation density of the insulating media within the insulating cavity. A valve is attached to the insulating structure and defines selective communication between the insulating cavity and an exterior of the insulating structure. The valve in a passive state releases gas disposed within the insulating cavity to the exterior during operation of the operable piston. A pump mechanism is in communication with the valve. Selective operation of the pump mechanism places the valve in an active state to extract gas from the insulating cavity and define a cavity pressure of the insulating cavity. The cavity pressure is less than an equalized pressure. The operable piston and the pump mechanism are at least one of sequentially operable and simultaneously operable to define a selected piston chamber environment defined by the selected cavity volume and the cavity pressure.

According to another aspect, a piston chamber receives the insulating structure and maintains an outer perimeter of the insulating structure as a consistent depth during operation of the operable piston.

According to yet another aspect, the outer wrapper and the inner liner are attached together via a trim breaker.

According to another aspect of the present disclosure, a depth of the insulating structure at an outer perimeter of the insulating structure is consistent during operation of the operable piston.

According to another aspect, the operable piston includes a surface that matingly engages a pressing surface of the insulating structure, wherein the pressing surface includes a plurality of reinforcing structures.

According to yet another aspect, the insulating structure includes a compression panel having an outer deflecting area and a pressing surface that is within the deflecting area. The operable piston engages the pressing surface and is free of engagement with the deflecting area.

According to another aspect of the present disclosure, the operable piston moves the pressing surface from an offset position that is a first distance from an opposing wall to a target position that is a second distance from the opposing wall. The first distance is greater than the second distance and the second distance corresponds to the selected cavity volume of the insulating cavity.

According to another aspect, during operation of the pressing surface from the offset position to the target position, the deflecting area operates from an angled orientation with respect to the pressing surface to a coplanar orientation with respect to the pressing surface.

According to yet another aspect, the operable piston includes a surface contour that matches a contour of the pressing surface.

According to another aspect of the present disclosure, the insulating structure is a door for an appliance cabinet.

According to another aspect, the operable piston is operated by a mechanical press.

According to yet another aspect, the insulating media comprises at least one of fumed silica, rice husk and glass spheres.

According to another aspect of the present disclosure, a method for forming an insulating structure for an appliance includes forming an insulating cavity at least between an inner liner and an outer wrapper of the insulating structure. A predetermined amount of an insulating media is disposed within the insulating cavity. A gas valve is disposed within at least one of the inner liner and the outer wrapper. The gas valve defines a selective communication between the insulating cavity and an exterior of the insulating structure. A gas pump is disposed in communication with the gas valve. The gas pump is in communication with the insulating cavity via the gas valve. An operable piston is provided that is operable against the insulating structure. At least one of the operable piston and the gas pump are operated to define a selected insulating cavity environment that corresponds to a desired insulation density of the insulating media. The operable piston operates to a predetermined location relative to the insulating structure to define a selected insulating cavity volume. The gas pump is operated to define a selected insulating cavity pressure. The selected insulating cavity volume and the selected insulating cavity pressure define the selected insulating cavity environment within which the insulating media is maintained at the desired insulation density.

According to another aspect, when only the operable piston is operated to define the desired insulation density, the gas valve selectively operates in a passive state to release gas disposed within the insulating cavity to the exterior. The passive state is defined by an equalized pressure between the insulating cavity and the exterior during operation of the operable piston to define the desired insulation density.

According to yet another aspect, when both the operable piston and the gas pump are operated to define the selected insulating cavity environment and the desired insulation density, operation of the operable piston and the gas pump can include at least one of a sequential pattern and a simultaneous pattern. The sequential pattern is defined by sequential operation of the operable piston and the gas pump. The simultaneous pattern is defined by simultaneous operation of the operable piston and the gas pump.

According to another aspect of the present disclosure, the operable piston operates to move a pressing surface from an offset position to a target position. The target position corresponds to the selected insulating cavity volume.

According to another aspect, a current pressure of the insulating cavity is monitored to determine a current insulating cavity pressure. A current volume of the insulating cavity is monitored to determine when the current volume is substantially equal to a selected chamber volume. A current density of the insulating media is determined by comparing the predetermined amount of the insulating media to the current pressure and the current volume. The operable piston is deactivated when the current density is substantially equal to the desired insulation density.

According to yet another aspect, a method for forming an insulative member includes forming a wrapper for an insulating structure. The wrapper defines an insulating cavity. A predetermined amount of an insulating media is disposed into the insulating cavity. The insulating media has a pre-compaction density. The insulating media is modified to define a desired insulation density by applying a positive compression to and generating a negative compression within the insulating media during a simultaneous compression phase. At least the simultaneous compression phase is operated until the insulating media reaches the desired insulation density. The desired insulation density is greater than the pre compaction density. The insulating cavity is sealed to maintain the desired insulation density of the insulating media within the insulating cavity to form the insulating structure.

According to another aspect of the present disclosure, the positive compression is applied by an operable piston that presses the insulating media. The negative compression is generated by a gas pump that generates an at least partial vacuum within the insulating cavity.

According to another aspect, the insulating media comprises at least one of fumed silica, rice husk and glass spheres.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term “coupled” (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. An insulation compaction device for installing insulation within an insulating structure of an appliance, the insulation compaction device comprising:

an outer wrapper and an inner liner that are attached together to define the insulating structure having an insulating cavity defined therein, at least one of the outer wrapper and the inner liner including a compression panel that defines a pressing surface having reinforcing structures;

an insulating media disposed within the insulating cavity;

an operable piston selectively engaging the insulating structure, wherein the operable piston operates to define a selected cavity volume of the insulating cavity and a selected insulation density of the insulating media within the insulating cavity, the operable piston having a surface contour that matingly engages the reinforcing structures of the pressing surface to prevent lateral displacement of the pressing surface during operation of the operable piston to the selected cavity volume;

a valve attached to the insulating structure and defining selective communication between the insulating cavity and an exterior of the insulating structure, wherein the valve in a passive state releases gas disposed within the insulating cavity to the exterior during operation of the operable piston; and a pump mechanism in communication with the valve, wherein selective operation of the pump mechanism places the valve in an active state to extract gas from the insulating cavity and define a cavity pressure of the insulating cavity, the cavity pressure being less than an equalized pressure, and wherein the operable piston and the pump mechanism are at least one of sequentially operable and simultaneously operable to define a selected piston chamber environment defined by the selected cavity volume and the cavity pressure.

2. The insulation compaction device of claim 1, further comprising:

a piston chamber that receives the insulating structure and maintains an outer perimeter of the insulating structure as a consistent depth during operation of the operable piston.

3. The insulation compaction device of claim 2, wherein the piston chamber maintains an outer perimeter of the insulating structure during operation of the operable piston to the selected cavity volume.

4. The insulation compaction device of claim 3, wherein the piston chamber maintains a depth of the insulating structure proximate the outer perimeter during operation of the operable piston.

5. The insulation compaction device of claim 1, wherein the outer wrapper and the inner liner are attached together via a trim breaker.

6. The insulation compaction device of claim 5, wherein the positioning of the operable piston relative to the pressing surface maintains the operable piston separate from the trim breaker.

7. The insulation compaction device of claim 1, wherein a depth of the insulating structure at an outer perimeter of the insulating structure is consistent during operation of the operable piston.

8. The insulation compaction device of claim 1, wherein the insulating structure includes the compression panel having an outer deflecting area and the pressing surface that is within the outer deflecting area, and wherein the operable piston engages the pressing surface and is free of engagement with the outer deflecting area.

9. The insulation compaction device of claim 8, wherein the insulating media comprises at least one of fumed silica, rice husk and glass spheres.

10. The insulation compaction device of claim 8, wherein the outer deflecting area includes deflecting sections that guide movement of the outer deflecting area during operation of the operable piston to the selected cavity volume.

11. The insulation compaction device of claim 10, wherein the deflecting sections include pleats that guide the motion of the outer deflecting area to the selected cavity volume.

12. The insulation compaction device of claim 8, wherein the surface contour of the operable piston includes a transition portion that engages a transitional rim of the compression panel.

13. The insulation compaction device of claim 12, wherein the transitional rim extends between the pressing surface and the outer deflecting area.

14. The insulation compaction device of claim 12, wherein the transitional rim assists in maintaining a position of the pressing surface relative to an outer perimeter of the insulating structure during operation of the operable piston.

15. The insulation compaction device of claim 12, wherein the transitional rim defines an edge of the pressing surface.

16. The insulation compaction device of claim 8, wherein the operable piston moves the pressing surface from an offset position that is a first distance from an opposing wall to a target position that is a second distance from the opposing wall, wherein the first distance is greater than the second distance and the second distance corresponds to the selected cavity volume of the insulating cavity.

17. The insulation compaction device of claim 16, wherein during operation of the pressing surface from the offset position to the target position, the outer deflecting area operates from an angled orientation with respect to the pressing surface to a coplanar orientation with respect to the pressing surface.

18. The insulation compaction device of claim 17, wherein the surface contour of the operable piston matches a contour of the pressing surface.

19. The insulation compaction device of claim 1, wherein the insulating structure is a door for an appliance cabinet.

20. The insulation compaction device of claim 1, wherein the operable piston is operated by a mechanical press.

* * * * *